United States Patent
Alcantara et al.

(10) Patent No.: US 9,354,822 B2
(45) Date of Patent: May 31, 2016

(54) PROGRAMMABLE DATA READ MANAGEMENT SYSTEM AND METHOD FOR OPERATING THE SAME IN A SOLID STATE DRIVE

(71) Applicant: NXGN Data, Inc., Irvine, CA (US)

(72) Inventors: Joao Alcantara, Irvine, CA (US); Vladimir Alves, Tustin, CA (US)

(73) Assignee: NXGN Data, Inc., Irvine, CA (US)

( * ) Notice: Subject to any disclaimer, the term of this patent is extended or adjusted under 35 U.S.C. 154(b) by 82 days.

(21) Appl. No.: 14/210,122

(22) Filed: Mar. 13, 2014

(65) Prior Publication Data

US 2015/0261475 A1 Sep. 17, 2015

(51) Int. Cl.
*G06F 3/06* (2006.01)
(52) U.S. Cl.
CPC .............. *G06F 3/0656* (2013.01); *G06F 3/067* (2013.01); *G06F 3/0608* (2013.01)
(58) Field of Classification Search
CPC ...... G06F 3/067; G06F 3/0608; G06F 3/0656
See application file for complete search history.

(56) References Cited

U.S. PATENT DOCUMENTS

| | | | | |
|---|---|---|---|---|
| 2008/0005404 A1* | 1/2008 | Ternovsky | ...................... | 710/56 |
| 2010/0290146 A1* | 11/2010 | Lam | ................................ | 360/39 |
| 2011/0137889 A1* | 6/2011 | Nayberg | ...................... | 707/713 |
| 2013/0297986 A1* | 11/2013 | Cohen | ........................... | 714/763 |
| 2015/0135031 A1* | 5/2015 | Cohen et al. | .................. | 714/758 |

* cited by examiner

*Primary Examiner* — Idriss N Alrobaye
*Assistant Examiner* — Ronald Modo
(74) *Attorney, Agent, or Firm* — Lewis Roca Rothgerber Christie LLP

(57) ABSTRACT

A method of reading host data from a storage device including a central processing unit (CPU), a self-organized fast release buffer (FRB), and a non-volatile memory, the storage device being in communication with a host, the method including receiving, by the FRB, a command to read host data stored in the non-volatile memory from the CPU, the host data being stored in the non-volatile memory as one or more codewords (CWs), allocating space, by the FRB, in a buffer memory of the FRB for storage of the one or more CWs, storing, by the FRB, the one or more CWs into the allocated space in the buffer memory, extracting, by the FRB, the host data from the stored one or more CWs, and transferring, by the FRB, the host data to the host.

16 Claims, 13 Drawing Sheets

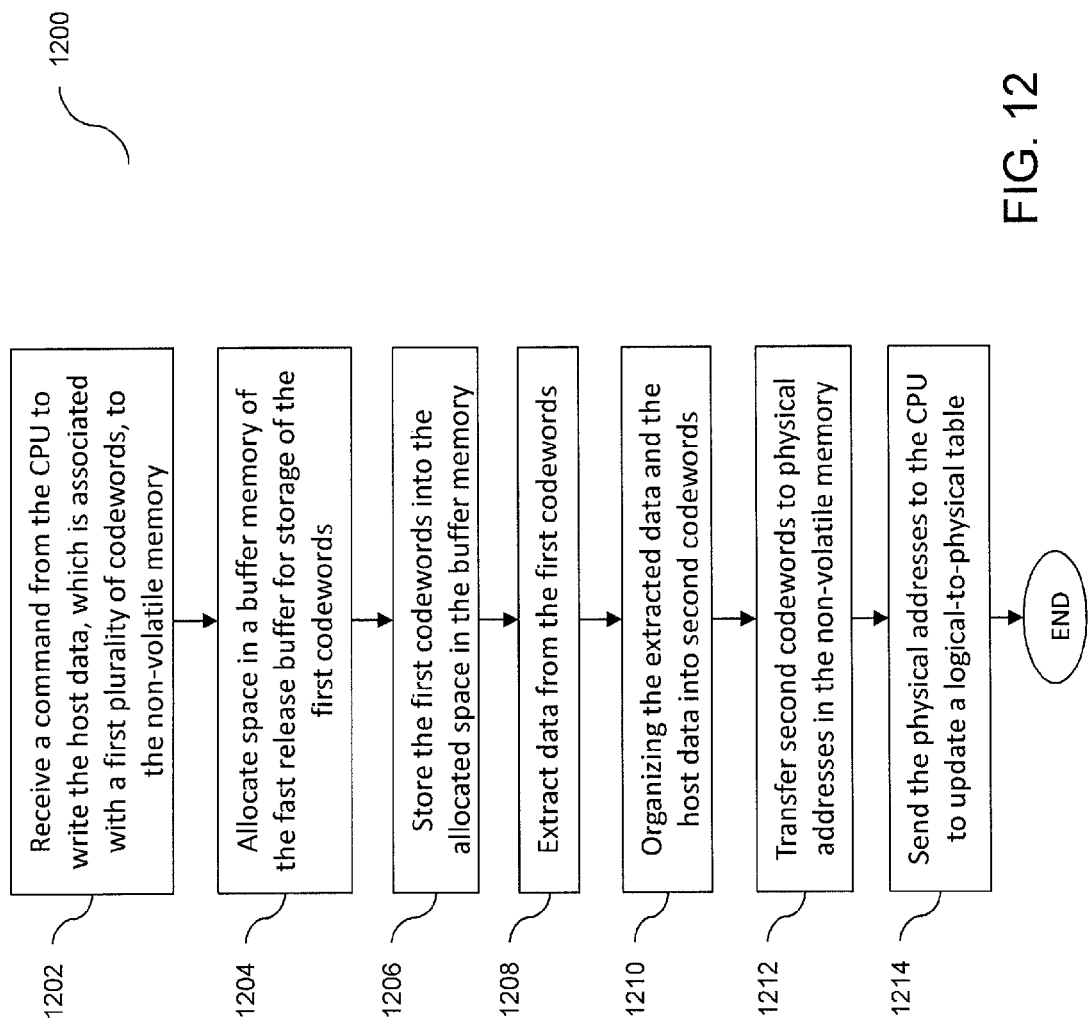

PROGRAMMABLE DATA READ MANAGEMENT SYSTEM AND METHOD FOR OPERATING THE SAME IN A SOLID STATE DRIVE

CROSS-REFERENCE TO RELATED APPLICATION(S)

This application is related to U.S. Pat. No. 9,092,362 (entitled "Programmable Data Write Management System and Method for Operating the Same in a Solid State Drive", U.S. patent application Ser. No. 14/210,135 (entitled "System and Method for Management of Garbage Collection Operation in a Solid State Drive", and U.S. patent application Ser. No. 14/210,185 (entitled "Configurable Read-Modify-Write Engine and Method for Operating the same in a Solid State Drive", all filed on even date herewith, the entire contents of which are incorporated herein by reference.

This application is also related to a U.S. patent application entitled "System and Method for Efficient Flash Translation Layer" (U.S. application Ser. No. 14/092,817) and a U.S. patent application entitled "System and Method for Supporting Atomic Writes in a Flash Translation Layer" (U.S. application Ser. No. 14/092,821), both filed on Nov. 27, 2013, the entire contents of which are incorporated herein by reference.

FIELD

The following description relates to non-volatile storage systems and more particularly to a programmable data read management system and method for operating the same in the non-volatile solid-state drive.

BACKGROUND

Every day, several quintillion bytes of data may be created around the world. This data comes from everywhere: posts to social media sites, digital pictures and videos, purchase transaction records, bank transactions, sensors used to gather data and intelligence, like climate information, cell phone GPS signal, and many others. This type (e.g., kind) of data and its vast accumulation is often referred to as "big data." This vast amount of data eventually is stored and maintained in storage nodes, such as solid-state storage drives (SSDs), and the like, and these may reside on networks or on storage accessible via the Internet. This stored data may require processing, or be subject to operations, such as search, query, encryption/decryption, compression, decompression, and/or other processes. In a server platform, for example, a processing device, such as a central processing unit (CPU), performs operations on the data. The data may be read from the SSD, processed by the CPU, and the processed data may be sent to the source of a request. The SSD may include a non-volatile memory (e.g., flash memory) for storage of data and a controller that facilitates the transfer of data to and from the non-volatile memory.

The controller may be capable of queuing read and write operations in order to increase performance of the data transfers to and from a host (e.g., a server). As such, the host may send several command requests to the SSD, and the controller may pre-process the commands and send more than one request at a time to the non-volatile memory, thus, improving the overall performance of the SSD.

The data transfers to and from the host may be staged in an internal data buffer of the SSD to adjust for different data formats between the non-volatile memory and the host. In addition, the internal data buffer provides a temporary storage location for the various commands that may be executing concurrently by the controller, and thus, compensates for the variation in performance caused by conflicts on the memory channel buses and allows for a uniform bandwidth from perspective of the host.

In the related art SSD controller, a controller processor allocates and de-allocates space in the internal data buffer. The controller processor calculates the amount of space available in the internal data buffer and where in the internal data buffer each piece of data is to be stored and allocates/de-allocates space in the internal data buffer in response to a write or read command from the host. However, this process may be time consuming and present an overhead for the controller processor that directly affects the performance and latency of the SSD.

Therefore, what is desired is a system and method for management of the internal data buffer of the SSD, which reduces (e.g., minimizes) the involvement of the controller processor in a read or write operation and frees up the controller processor to perform other operations, thus improving the overall performance of the SSD.

SUMMARY

Aspects of embodiments of the present invention are directed toward a programmable data read management system and method for operating the same in the non-volatile solid-state drive.

Aspects of embodiments of the present invention are directed toward a fast release buffer (FRB) for management of an internal data buffer of a solid-state storage drive (SSD) controller, for the conversion of codeword(s) retrieved from the non-volatile memory, and for performance of a host read operation upon receiving a read command from the controller processor.

According to an embodiment of the present invention there is provided a method of reading host data from a storage device including a central processing unit (CPU), a self-organized fast release buffer (FRB), and a non-volatile memory, the storage device being in communication with a host, the method including: receiving, by the FRB, a command to read host data stored in the non-volatile memory from the CPU, the host data being stored in the non-volatile memory as one or more codewords (CWs); allocating space, by the FRB, in a buffer memory of the FRB for storage of the one or more CWs; storing, by the FRB, the one or more CWs into the allocated space in the buffer memory; extracting, by the FRB, the host data from the stored one or more CWs; and transferring, by the FRB, the host data to the host.

In an embodiment, the command includes a size of each CW of the one or more CWs.

In an embodiment, the buffer memory includes a plurality of codeword (CW) spaces, each CW space of the plurality of CW spaces being associated with a CW index of a plurality of CW indexes, the CW indexes being stored in a CW pool of the FRB, and wherein the allocating of the space in the buffer memory includes: determining, by the FRB, a count N of the one or more CWs; retrieving, by the FRB, N CW indexes from the CW pool on a first-in-first-out basis; removing, by the FRB, the N CW indexes from the CW pool; and associating, by the FRB, the N CW indexes with the host data.

In an embodiment, the storing of the one or more CWs includes storing the one or more CWs into N CW spaces of the buffer memory that are associated with the retrieved N CW indexes.

In an embodiment, the method further includes de-allocating, by the FRB, the allocated space in the buffer memory.

In an embodiment, the de-allocating of the allocated space in the buffer memory includes adding, by the FRB, the removed N CW indexes to the CW pool.

In an embodiment, the plurality of CW indexes is added to the CW pool at time of initialization of the storage device.

In an embodiment, the extracting of the host data from the one or more retrieved CWs includes: decoding, by the FRB, the one or more CWs to generate one or more payload sections and corresponding one or more parity sections; and combining, by the FRB, the one or more payload sections to recreate the host data.

In an embodiment, the decoding of the one or more payload sections includes: instructing, by the FRB, an error correction code (ECC) engine to decode the one or more CWs and to generate the one or more corrected payload sections and the corresponding one or more parity sections; receiving, by the FRB, the one or more corrected payload sections, wherein bits of the one or more corrected payload sections are corrected by the ECC engine based on the one or more corresponding parity sections.

In an embodiment, each parity section of the one or more parity sections includes one or more parity bits.

According to an embodiment of the present invention there is provided a storage device configured to transfer host data to a host in response to a host read request, the storage device including a central processing unit (CPU), a self-organized fast release buffer (FRB), and a non-volatile memory, the FRB including: a processor; and a memory having stored thereon instructions that, when executed by the processor, cause the processor to perform: receiving a command to read host data stored in the non-volatile memory from the CPU, the host data being stored in the non-volatile memory as one or more codewords (CWs); allocating space in a buffer memory of the FRB for storage of the one or more CWs; storing the one or more CWs into the allocated space in the buffer memory; extracting the host data from the stored one or more CWs; and transferring the host data to the host.

In an embodiment, the buffer memory includes a plurality of codeword (CW) spaces, each CW space of the plurality of CW spaces being associated with a CW index of a plurality of CW indexes, the CW indexes being stored in a CW pool of the FRB, and wherein the allocating of the space in the buffer memory includes: determining a count N of the one or more CWs; retrieving N CW indexes from the CW pool on a first-in-first-out basis; removing the N CW indexes from the CW pool; and associating the N CW indexes with the host data.

In an embodiment, the storing of the one or more CWs includes storing the one or more CWs into N CW spaces of the buffer memory that are associated with the retrieved N CW indexes.

In an embodiment, the instructions stored on the memory, when executed by the processor, further cause the processor to perform de-allocating the allocated space in the buffer memory.

In an embodiment, the de-allocating of the allocated space in the buffer memory includes adding the removed N CW indexes to the CW pool.

In an embodiment, the plurality of CW indexes is added to the CW pool at time of initialization of the storage device.

In an embodiment, the extracting of the host data from the one or more retrieved CWs includes: decoding the one or more CWs to generate one or more payload sections and corresponding one or more parity sections; and combining the one or more payload sections to recreate the host data.

In an embodiment, the decoding of the one or more payload sections includes: instructing an error correction code (ECC) engine to decode the one or more CWs and to generate the one or more corrected payload sections and the corresponding one or more parity sections; receiving the one or more corrected payload sections, wherein bits of the one or more corrected payload sections are corrected by the ECC engine based on the one or more corresponding parity sections.

According to an embodiment of the present invention there is provided a storage device configured to transfer host data to a host in response to a host read command, the storage device including: a host controller coupled to the host and configured to receive the host read command, to receive host data from a self-organized fast release buffer (FRB), and to transfer the host data to the host; a channel controller coupled to a non-volatile memory of the storage device and configured to retrieve one or more codewords (CWs) from the non-volatile memory and to transfer the one or more CWs to the FRB; a central processing unit (CPU) coupled the host controller and the FRB, and configured to send to the FRB a command to read host data from the non-volatile memory in response to the host read command received by the host controller; an error correction code (ECC) engine coupled to the FRB and configured to decode the one or more CWs; and the self-organized fast release buffer (FRB) including: a processor; and a memory having stored thereon instructions that, when executed by the processor, cause the processor to perform: receiving a command to read host data stored in the non-volatile memory from the CPU, the host data being stored in the non-volatile memory as one or more codewords (CWs); allocating space in a buffer memory of the FRB for storage of the one or more CWs; receiving the one or more CWs from the channel controller; storing the one or more CWs into the allocated space in the buffer memory; extracting the host data from the stored one or more CWs; and sending the host data to the host controller for transfer to the host.

In an embodiment, the extracting of the host data from the one or more retrieved CWs includes: instructing the ECC engine to decode the one or more CWs and to generate one or more corrected payload sections and corresponding one or more parity sections; receiving the one or more corrected payload sections; and combining the one or more corrected payload sections to recreate the host data.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be illustrative only.

FIG. 12 is a flow diagram of a process for writing host data to a SSD utilizing a read-modify-write process, according to an illustrative embodiment of the present invention.

DETAILED DESCRIPTION

The detailed description set forth below in connection with the appended drawings is intended as a description of illustrative embodiments of a system and method for performance of an efficient write, read, and/or garbage collection process in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

The present invention relates to a controller of a solid state drive with improved read, write, and garbage collection capability, and a method of operating the same. A fast release buffer (FRB) in the controller manages the internal data buffer of the SSD and reduces (e.g., minimizes) the involvement of the controller processor in a read, write, or garbage collection operation and frees up the controller processor to perform other operations, thus improving the overall performance of the SSD.

According to an embodiment, the FRB organizes host data into codewords during write operations, and receives the codewords from the non-volatile memory (e.g., Flash memory) and organizes the data in compliance with the host data format during a read operation. In an embodiment, the translation from host to memory format (e.g., Flash format) is executed by hardware, consequently, minimizing involvement by the controller processor. Further, in an embodiment, the FRB compensates for possible slow write speeds of the memory devices of the non-volatile memory and improves (e.g., maximizes) the memory write performance by interleaving the host data to utilize many (e.g., all) memory devices in the non-volatile memory.

Figure 1:
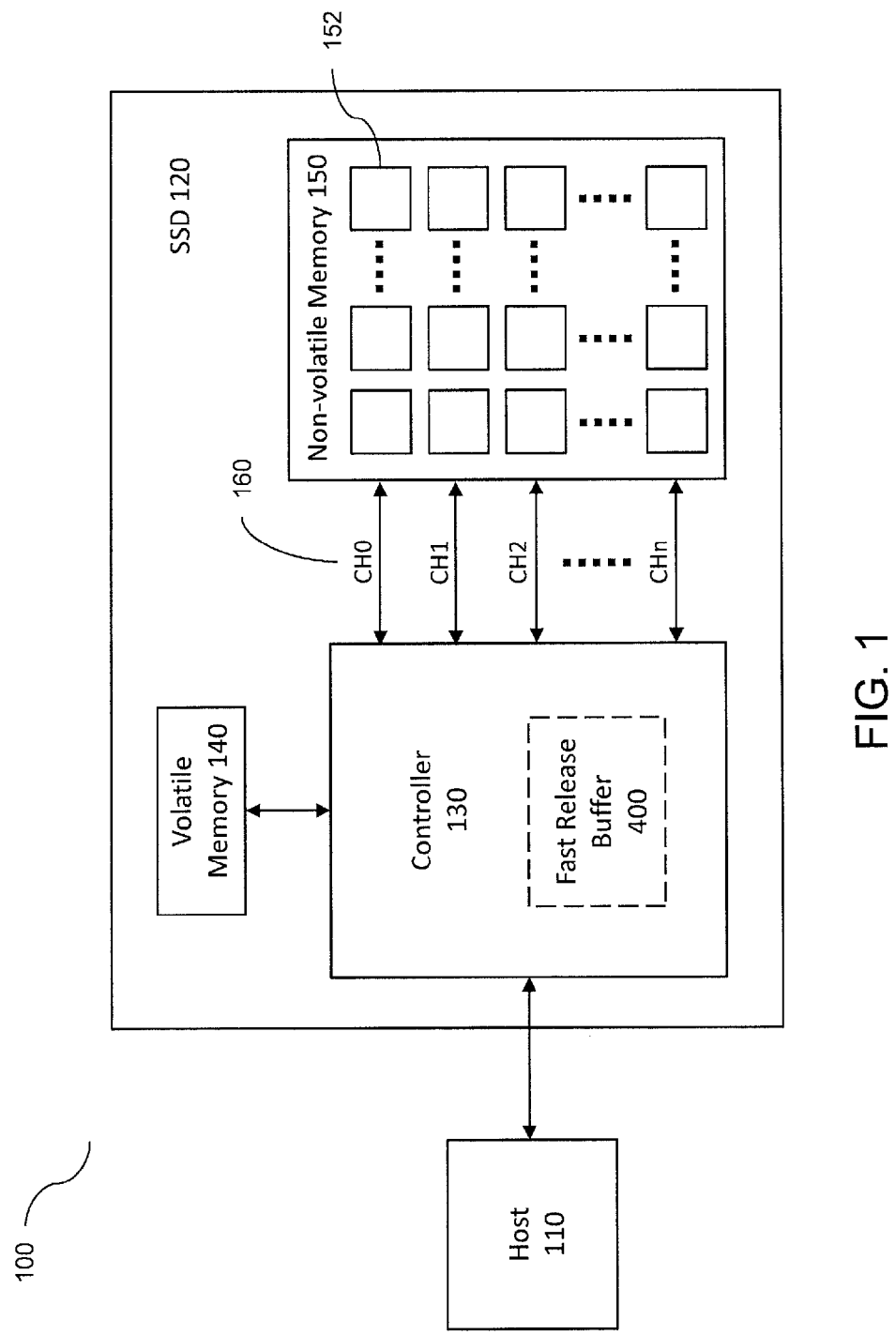
FIG. 1 is a block diagram of a system, which includes a host in communication with a storage node for performing host commands, according to an illustrative embodiment of the present invention.

FIG. 1 is a block diagram of a system 100, which includes a host 110 (e.g., a server host) in communication with a storage node (e.g., SSD) 120 for performing host commands, according to an embodiment of the present invention.

In some embodiments, the host 110 and the SSD 120 may be implemented in a cloud-based computing environment. The host 110 and the SSD 120 may communicate using any storage buses as well as PCIe with any protocol that runs on it. In other embodiments, an SSD 120 may be connected to, and controlled by, a host central processing unit (CPU), which need not be a server CPU but may be a CPU in an application not configured as a server. Thus a server CPU may be an example of a host processor.

As used herein, the phrase "in communication with" refers to direct communication with, or in indirect communication with, via one or more components named or unnamed herein. The host 110 and the SSD 120 can be in communication with each other via a wired or wireless connection. For example, in an embodiment, the SSD 120 may include a connector having pins (or a socket) to mate with a corresponding socket (or pins) on the host 110 to establish an electrical and physical connection. In another embodiment, the SSD 120 can include a wireless transceiver to place the host 110 and the SSD 120 in wireless communication with each other. The host 110 and the SSD 120 may be separately housed from each other, or contained in the same housing. The host 110 and the SSD 120 may include additional components, which are not shown in FIG. 1 to simplify the drawing.

The host 110 includes a processing device, such as a CPU, which performs operations on the data. The data may be written to the SSD 120 or may be read from the SSD 120, processed by the CPU, and the processed data may be sent to the source of a request. The host 110 operates based on logical addresses of the data, and may be unaware of the physical locations (e.g., also referred to as NAND flash physical addresses) of the data stored on the SSD 120.

According to an embodiment of the present invention, the SSD 120 may include a controller 130, a volatile memory (e.g., dynamic random access memory (DRAM)) 140, and a non-volatile memory (e.g., flash memory) 150 including one or more memory devices (e.g., flash dies or NAND flash chips) 152. The controller 130 facilitates the transfer of data to and from the SSD 120 and includes a flash translation layer (FTL), which may be a software layer acting as a translation layer between the sector-based file system of the host 110 and the flash memory devices 152 of the SSD 120. The FTL, which may be implemented in software and/or hardware, provides the operating system and the file system on the host side access to the flash memory devices 152 and ensuring that they behave (or appear) as one block storage device. In so doing, the FTL hides the complexity of flash by providing a logical block interface to the flash device by mapping the host's logical addresses to the flash memory's (e.g., NAND flash memory's) physical addresses in the logical to physical (LtoP) table. The LtoP table may be stored in the volatile memory 140 and the data to and/or from the host 110 may be stored in the non-volatile memory 150. In an example, the LtoP table may also be stored in the non-volatile memory 150.

The SSD 120 (e.g., the controller 130) may further include a channel controller having one or more bi-directional channels (e.g., flash channels) acting as conduits for transferring data to and from the non-volatile memory 150. Each channel 160 may correspond to (e.g., be coupled to) one or more memory dies 152. Having a number of channels 160 enables parallel processing of the write and read commands by the controller 130 as, for example, at any given time, one channel 160 may be writing to a set of memory dies 152, while another channel 160 may be reading from a different set of memory dies 152.

The controller 130 is configured to be capable of queuing operations in order to increase (e.g., optimize) performance of the data transfers to and from the host 110. Further, the controller 130 is configured to manage variable command queue depth from the host 110. As such, the host 110 may send several command requests to the SSD 120, and the controller 130 may pre-process the commands and send more than one request at a time to the non-volatile memory 150, thus, improving (e.g., increasing) the overall performance of the SSD 120. According to an embodiment, the controller 130 includes a fast release buffer (FRB) 400 for operating an internal data buffer of the controller 130 and for streamlining the write, read, and garbage collection processes of the controller 130, thus improving the performance of the SSD 120.

Figure 2:
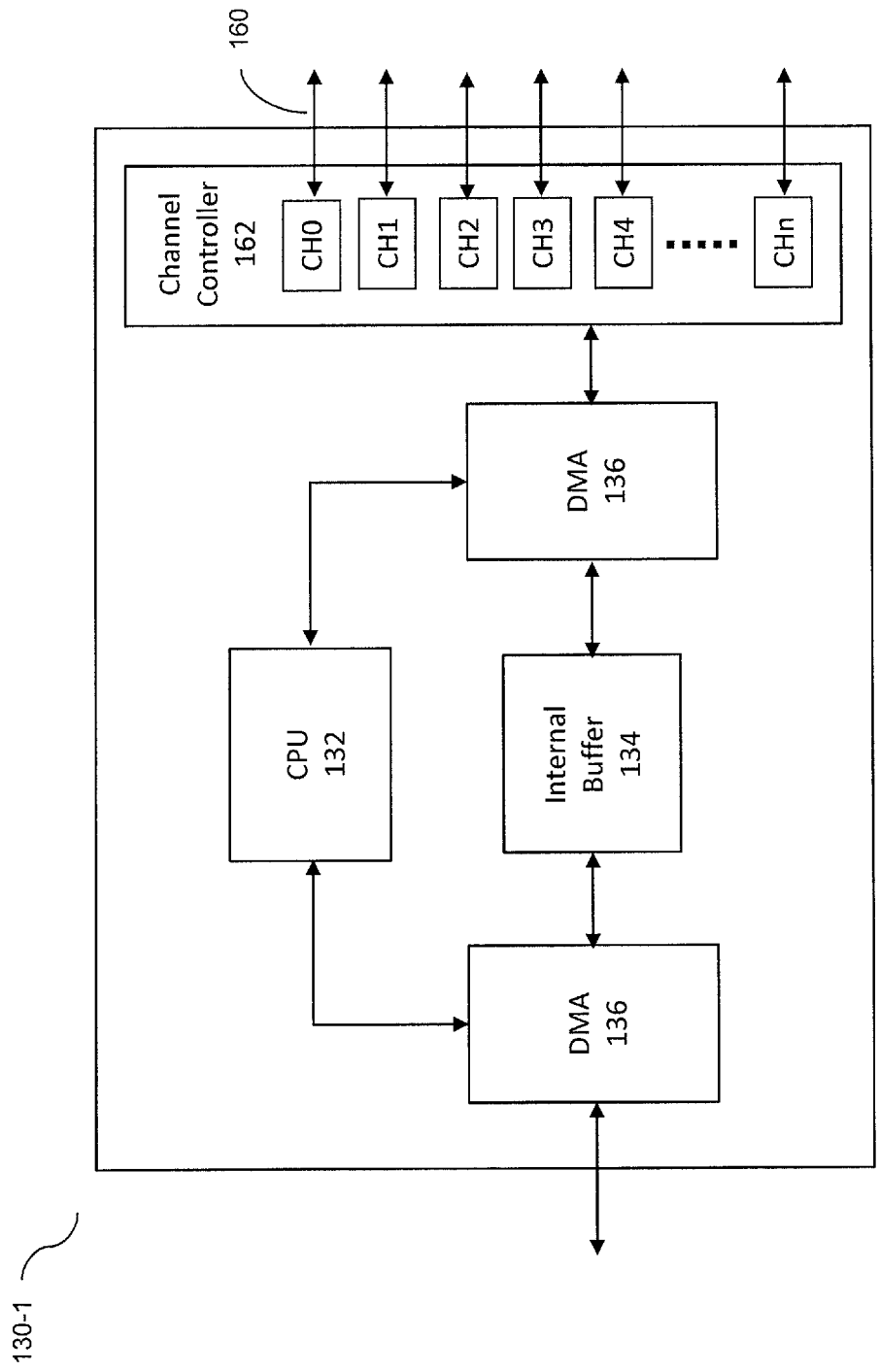
FIG. 2 is a block diagram of a related art solid state drive (SSD) controller in which data transfers between the host and the non-volatile memory are entirely managed by a controller processor and without the aid of a fast release buffer (FRB)

FIG. 2 is a block diagram of a related art SSD controller 130-1, in which data transfers between the host 110 and the non-volatile memory 150 are entirely managed by a controller processor (e.g., central processing unit (CPU)) 132 and without the aid of the FRB 400.

In the related art, data transfers to and from the host 110 may be staged in an internal data buffer 134 of the SSD 120 to adjust for different data formats between the memory devices 152 and the host 110. The controller processor 132 manages the data transfers from the host 110 to the internal data buffer 134 and from the internal data buffer 134 to the non-volatile memory 150, and vice-versa. In the related art SSD controller 130-1, the data transfers are performed by a direct memory access (DMA) engine (e.g., DMA controller) 136 and are programmed by the controller processor 132 to define the addresses at which the data will be located in the internal data buffer 134. The related art SSD controller 130-1 includes two bidirectional DMA controllers 136, one for performing transfers between the host 110 and the internal data buffer 134, and the other for performing data transfers between the internal data buffer 134 and a channel controller 162 having one or more bi-directional channels 162.

Without the DMA controllers 136, when performing a read or write operation, the controller processor 132 would be fully occupied for the entire duration of the operation, and would thus be unavailable to perform other operations. With the DMA controllers 136, the controller processor 132 initiates the data transfer (e.g., provides the scatter/gather list to the DMA controllers 136), performs other operations while the transfer is in progress, and receives an interrupt from the DMA controllers 136 when the operation is done. In this manner, the DMA controller 136 performs the actual storing. This feature may be useful any time the controller processor 132 cannot keep up with the rate of data transfer, or when the controller processor 132 needs to perform other tasks while waiting for a relatively slow host input/output (I/O) data transfer.

In the related art SSD controller 130-1, which does not utilize a FRB 400, the controller processor 132 allocates and de-allocates space in the internal data buffer 134. The controller processor 132 further calculates the amount of space available in the internal data buffer 134 and where in the internal data buffer 134 each piece of data is stored. For example, for a host write to the SSD 120, the controller processor 132 allocates sufficient available space in the internal data buffer 134 and programs the DMA controller 136 with the position (i.e., addresses) of the allocated space in the internal data buffer 134 to which data is be written. When sufficient data has been accumulated in the internal data buffer 134 to fill a flash page in the non-volatile memory 150, the controller processor 132 indicates, to the channel controller 162, the sequence of data in the internal data buffer 134 that is to be transferred to the non-volatile memory 150. Once the operation is complete, the controller processor 132 de-allocates the space occupied by the data that was transferred to the non-volatile memory 150. This process may be time consuming and present an overhead for the controller processor 132 that directly affects the performance and latency of the SSD 120.

Figure 3:
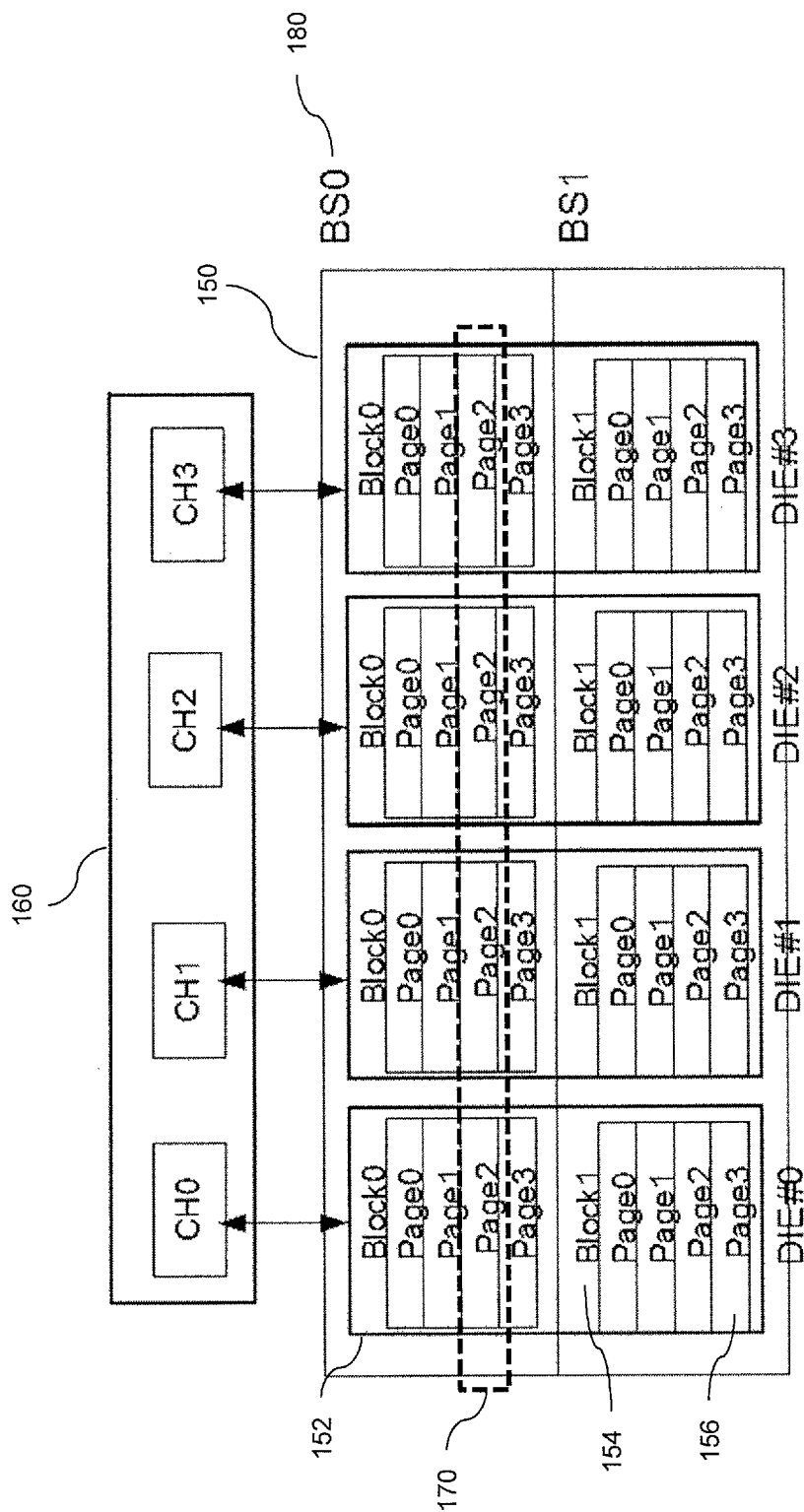
FIG. 3 is a representation of a related art non-volatile memory including a number of memory dies.

FIG. 3 is a representation of a related art non-volatile memory 150 including a number of memory dies (e.g., flash devices or flash dies) 152. A memory die 152 may be partitioned into blocks (e.g., flash blocks) 154 (such as block0 and block1 of die0), where each block 154 includes a number of pages (e.g., flash pages) 156 (such as pages0-4 of block1 of die0) of a fixed size (e.g., 512 Bytes). The page size may represent the smallest size of data that may be written to the memory die 152. Erasure of data on the memory die 152 may be performed in units of one block 154. A group of pages 156 having a same index (e.g., page0 of dies 1-P, where P is a positive integer greater than 1) may be referred to as a data stripe or page stripe 170. Similarly, a group of blocks 154 having a same index (e.g., block0 of dies 1-P) may be referred to as a block stripe 180.

For ease of illustration, the example of FIG. 3 illustrates a SSD 120 having 4 channels with one die per channel. However, as understood by a person of ordinary skill in the art, a greater number of channels and dies per channel are utilized in a related art SSD 120.

According to an embodiment of the present invention, to improve (e.g., optimize) performance during write operations to the non-volatile memory 150, a controller 130 may organize the incoming data from a host 110 into a sequential stream of data distributed across all memory devices 152, which may be referred to as host write stream. In an embodiment, the controller 130 may retrieve sequential and/or non-sequential host sectors from the host 110 and distribute them onto the non-volatile memory 150 in a sequentially organized manner. This sequential programming may be described as starting from an initial page stripe 170, programming the consecutive pages 156 within the initial page stripe 170, moving to a next page stripe 170 when all pages 156 of the initial page stripe 170 have been programed to, sequentially programming the pages 156 within the next page stripe 170, and so forth. For instance, in the example of FIG. 3, the controller 130 may write the host data to the memory dies 152 in the following order: PS0 of die0, PS0 of die1, PS0 of die2, PS0 of die3, PS1 of die0, PS1 of die1, and so forth.

Figure 4:
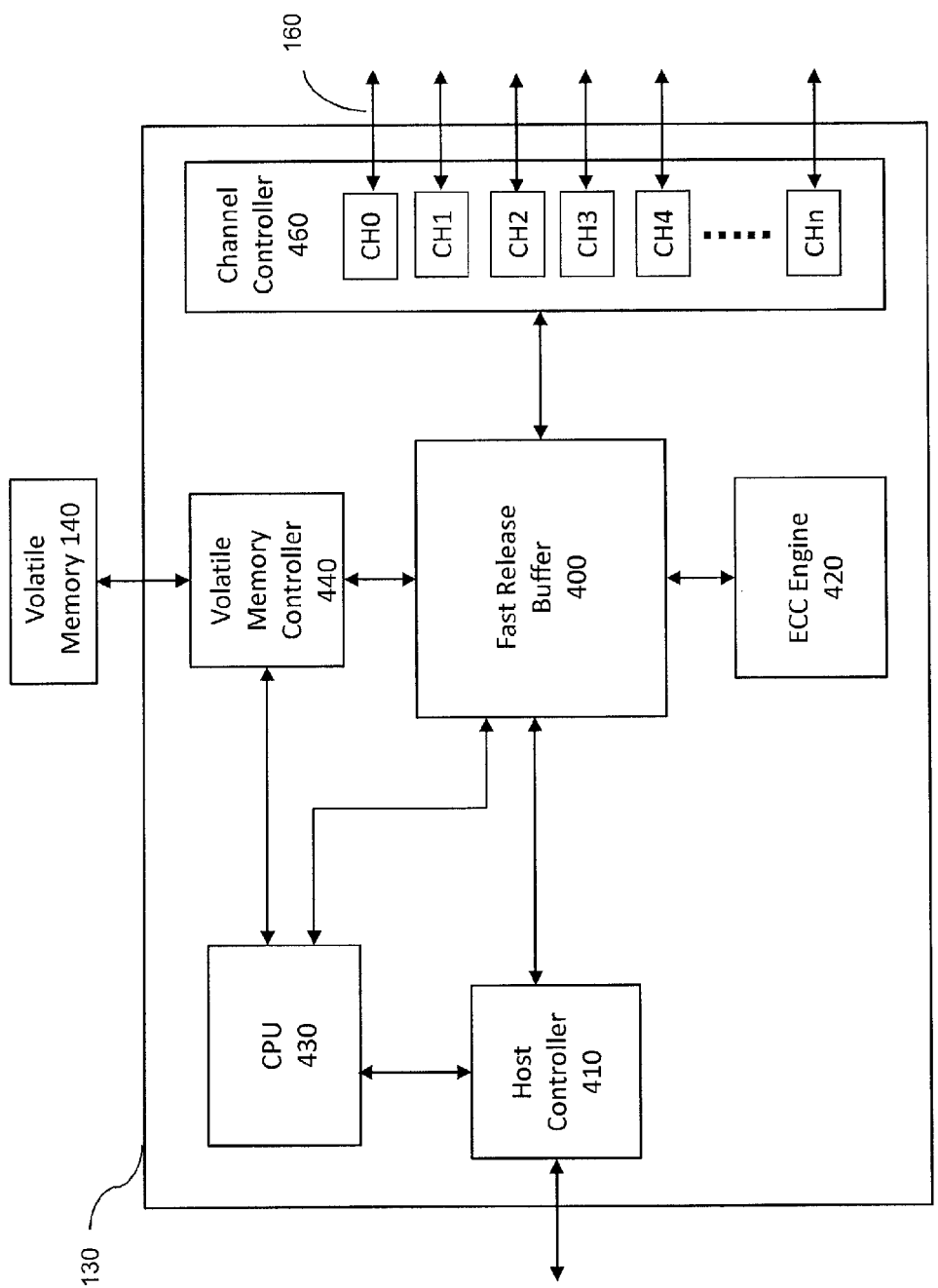
FIG. 4 is a block diagram of a SSD controller utilizing an FRB, according to an illustrative embodiment of the present invention.

FIG. 4 is a block diagram of a SSD controller 130 utilizing a fast release buffer (FRB) 400, according to an embodiment of the present invention. In an embodiment, the SSD controller 130 includes a fast release buffer (FRB) 400, a host controller 410, an ECC engine 420, a controller processor (e.g., a CPU) 430, a volatile memory controller 440, and a channel controller 460. According to an embodiment, the FRB 400 is distinct and separate from (e.g., physically and functionally separate from) the controller processor 430 and is not integrated with the controller processor 430.

According to an embodiment of the present invention, the FRB 400 is a central block responsible for the communication between the host 110 and the non-volatile memory 150. The FRB 400 performs a number of tasks related to the execution of read, write, and garbage collection (GC) operations. These tasks may include, for example, managing an internal data buffer allocation and release, organizing host data to match the flash data format (e.g., logical block number (LBN) to codeword (CW) translation), defining the physical location of the LBN's in the non-volatile memory 150, communicating with the ECC engine 420 to encode and decode CWs (e.g., data streams), managing host read, host write, and read-modify-write (RMW) executions command executions, and performing garbage collection on the non-volatile memory 150 (e.g., under the management of the controller processor 430), and/or managing the write/read tags. For example, the FRB 400 may send write page commands to channel controller 460, assemble a logical block during a read operation, and produce the host write stream and garbage collection stream. In some respects, the FRB 400 acts as an intermediary data buffer between the host 110 and the non-volatile memory 150 that self-organizes the data to and from the host and the non-volatile memory 150.

According to an embodiment of the present invention, the host controller 410 defines the destination (e.g., the FRB 400 or the volatile memory 140) of the logical blocks (LBs) of data being transferred to and from the host 110. Further, the host controller 410 receives host commands from the host 110 and forwards them to the controller processor 430, which decodes the commands and performs the appropriate action (s) to handle the commands. In an embodiment, the host controller 410 assigns a tag to a command upon receiving the command from the host 110. For example, during a write operation, the host controller 410 notifies the controller processor 430 of the incoming command and adds a command tag to it. Similarly, during a read operation, the host controller 410 notifies the controller processor 430 of the incoming command and adds a command tag to it. In an embodiment, the controller processor 430 may tag the host commands as read or write commands in lieu of the host controller 410. The host controller 410 initiates the transfer of data from the host 110 by transferring the respective logical blocks to the FRB 400. Once the FRB 400 notifies the host controller 410, either directly or via the controller processor 430, that the corresponding LBNs to the logical blocks are available, the host controller 410 requests the corresponding LBNs from the host 110.

According to an embodiment, the ECC engine 420 receives codeword (CW) encoding requests from the FRB 400 (as, for example, may occur during a write operation to the non-volatile memory 150) and generates code bits (e.g., parity bits) accordingly. Similarly, the ECC engine 420 may receive decode requests from the FRB 400 (as, for example, may occur during the read process from the non-volatile memory 150). During the decoding process, the ECC engine 420 may also correct bit errors in the data retrieved from the non-volatile memory 150 based on the code bits in the CW. In an embodiment, the ECC engine 420 also generates die-failure code bits corresponding to the lifetime of the memory device being written to.

The volatile memory controller 440 serves as an interface between the volatile memory and the controller processor 430 and the FRB 400.

In an embodiment, the channel controller 460 receives commands from the controller processor 430 and/or the FRB 400 to read from or write to the non-volatile memory 150. The channel controller 460 also manages the non-volatile memory 150 interface protocol (e.g., flash interface protocol). Once a write operation is completed by the channel controller 460, it sends a command complete signal to the FRB 400 and the controller processor 430, which signals the FRB 400 to release the internally allocated CW space that was associated with the write command, and signals the controller processor 430 to update the logical to physical (LtoP) table accordingly.

Figure 5:
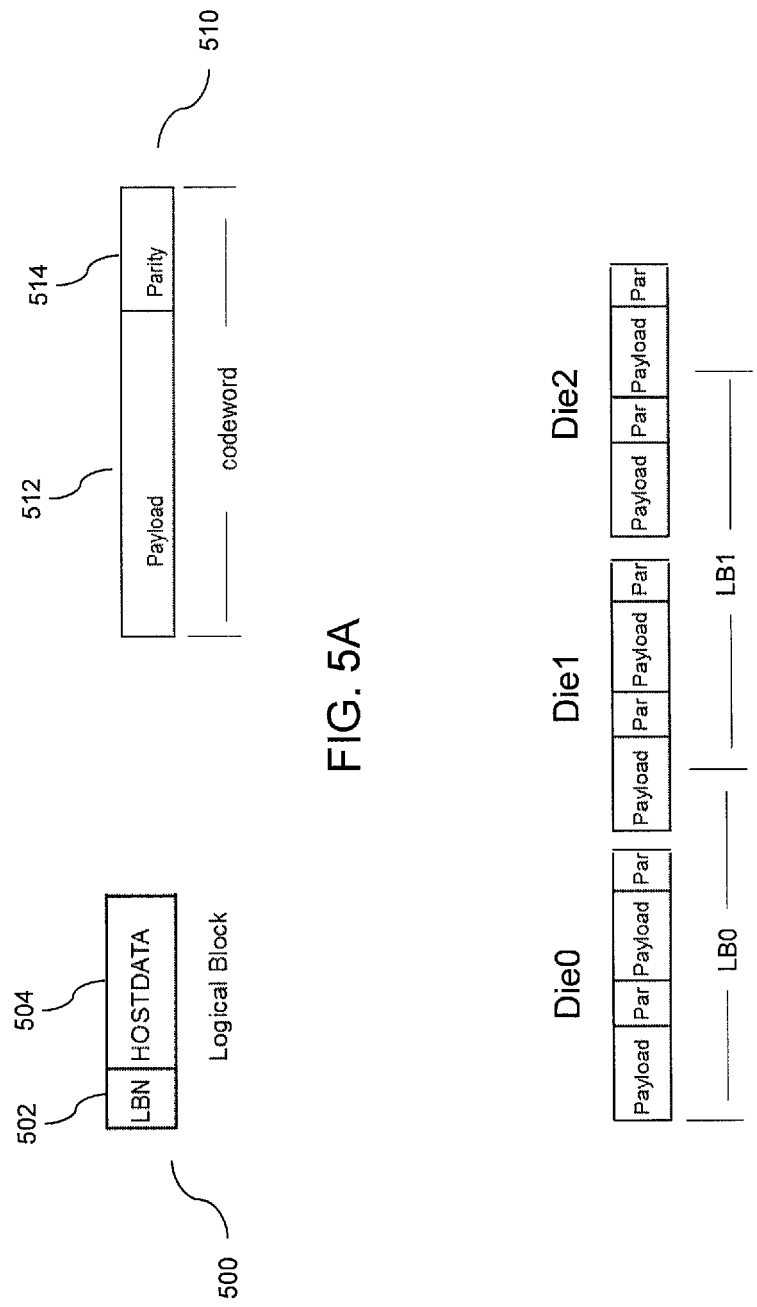
FIG. 5A is a representation of the organization of host data as a logical block and a codeword, according to an illustrative embodiment of the present invention.
FIG. 5B is a representation of the relative sizes of the codewords and memory pages of the non-volatile memory, according to an illustrative embodiment of the present invention.

FIG. 5A is a representation of the organization of host data as a logical block (LB) and a codeword, according to an illustrative embodiment of the present invention. FIG. 5B is a representation of the relative sizes of the codewords and memory pages of the non-volatile memory 150, according to an embodiment of the present invention.

According to an embodiment of the present invention, the controller 130 packages a host sector of data (hereinafter referred to as a host sector) 504 into a logical block (LB) 500, which includes a logical block number (LBN) 502 and host data 504. In an example, the host sector 504 may be 4 KB in size and the LBN 502 may be 4 bytes in size (thus making the logical block 500 about 4 KB in size). In an embodiment, the logical block 500 may be stored in the non-volatile memory 150 in the form of one or more codewords (CWs) 510, with each codeword (CW) 510 including a payload section 512 and a parity section (e.g., error correction codes or coded sections) 514. The payload section 512 may include at least part of a logical block 500 and the parity section 514 may be parity bits generated by the ECC engine 420 and corresponding with the bit values of the payload section 512. The parity bits may allow the controller 130 (e.g., via the ECC engine 420) to detect and/or correct errors in data retrieved from the non-volatile memory 150. The FRB 400 may communicate with the ECC engine 420 to encode/decode data to/from the non-volatile memory 150.

The size ratio of the payload section 514 to the codeword 510 may be referred to as a code rate, which may be set (e.g., determined) by a configuration register programmed by the controller processor 430.

The size of each codeword 510 may be set to a memory page size divided by an integer that is a power of two. Thus, the size of the logical block 500 may not be an integer multiple of the size of the CW. For example, a logical block 500 may occupy more than two CWs 510, as illustrated in FIG. 5B.

Figure 6:
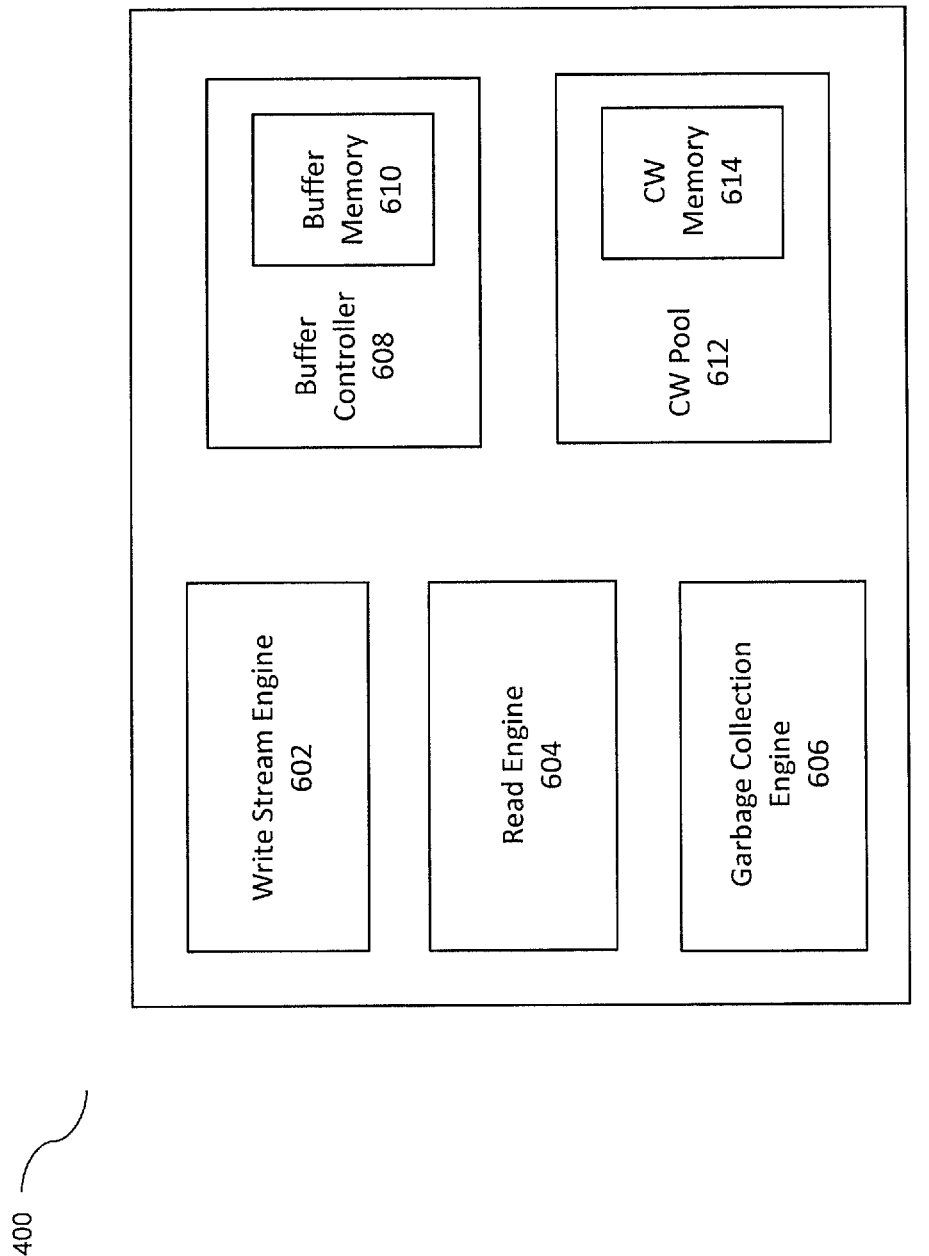
FIG. 6 is a block diagram of a FRB, according to an illustrative embodiment of the present invention.

FIG. 6 is a block diagram of a fast release buffer (FRB) 400, according to an embodiment of the present invention. In an embodiment, the FRB 400 includes a write stream engine 602, a read engine 604, a garbage collection (GC) engine 606, a buffer controller 608, and a codeword pool 612. The buffer controller 608 includes a buffer memory 610, which serves as the main data buffer in the controller 130. The CW pool 612 includes a codeword memory 614, which stores a list of available CWs (e.g., stores a list of indexes of available CWs) in the buffer memory 610.

In an embodiment, the buffer memory 610 is divided into regions that are each the size of a codeword. For example, a 2 MB buffer memory 610 may be divided into 1024 2 KB codewords, where codeword 0 indicates the first 2 KB of the buffer memory 610. The division of the buffer memory 610 may be determined by a configuration register programmed by the controller processor 430. All transfer of data between the FRB 400 and the channel controller 460 may occur at a CW granularity and any reference to read and/or write data from the buffer memory 610 is made through tags.

In an embodiment, the codeword size is set to the page size divided by a number that is a power of two (e.g., 2, 4, 8, etc.). For example, when a page size is 9296 Bytes (8 KB+1104 Bytes), a code-word size may be 9296 Bytes divided by 4, that is, 2324 Bytes. If a smaller codeword is desired or preferred, the page size may be divided by 8 to obtain a CW of 1162 Bytes. However, the FRB 400 may support any CW size that is defined by the controller processor 430. In an embodiment, the CW size utilized by the FRB 400 is constant throughout the life-time of the SSD 120.

According to an embodiment, the FRB 400 acts as a data buffer management block and organizes the host data into CWs and manages the space availability in the buffer memory 610. In an embodiment, the CW pool 612 stores the indexes of all available CWs in the CW memory 614 and maintains the order in which the CWs become available to be written to. The CW memory 614 of the CW pool 612 is a first-in-first-out (FIFO) memory in which all CW indexes may be added to during system initialization (e.g., at first power on at time of manufacturing). In the example of the 2 MB buffer memory divided into 1024 2-KB codewords, the first to last elements of the FIFO memory will initially contain the numbers 0 through 1023, as all CW indexes are available at startup. The presence of an index in the CW memory 614 indicates that the respective area in the buffer memory 610 is available to be utilized by any requesting block.

In an embodiment, the controller processor 430 is the only other block in the controller 130 that has information about the location of the data stored in the buffer memory 610.

According to an embodiment of the present invention, during a host write operation, the FRB 400 receives from the controller processor 430 an LBN write request and a write command tag (WrTag). The FRB 400 adds the LBN(s) to the current host data write stream, which may be located in the write stream engine 602, and allocates sufficient CW space in the buffer memory 610. The FRB 400 allocates the CW space by determining the number of CWs needed to store the host data, requesting the same number of CWs from the CW pool 612 and associating the CWs with the LBN(s) of the host data. The CW pool 612 releases the CWs on a FIFO basis and removes them from the CW memory 614 (e.g., deletes the respective CW indexes from the CW memory 614). The FRB 400 stores the host data corresponding with the LBN(s) as codewords in the allocated CW spaces, tags the CW indexes belonging to the same memory page in the non-volatile memory 150, and maintains the link between the tags and the CWs. In an embodiment, the FRB 400 sends a request to the ECC engine 420 to encode the CWs. In an embodiment, the FRB 400 also sends the physical location that the CWs will occupy in the non-volatile memory 150, so that the ECC engine 420 may generate die-specific failure parity protection to take into account the effect of memory wear on the die(s) being written to.

In an embodiment, when the host data occupies more than one logical block, the FRB 400 may be aware of the sequence of the LBNs and may organize the incoming host data in a sequential manner producing a write stream.

Once the FRB 400 has accumulated sufficient CWs in the buffer memory 610 to fill a page in the non-volatile memory 150, the FRB 400 or controller processor sends the write command to the channel controller 460 indicating the WrTag and the physical location of the flash page. The channel controller 460 may utilize the WrTag to request data from the FRB 400. The FRB 400 then links the WrTag to the list of CWs to be written and sends the correct data (i.e., the CWs) to the channel controller 460. In this manner, the channel controller 460 need not be aware of which CWs to request from the FRB 400.

Once the transfer of the CWs to the channel controller 460 is complete, the FRB 400 may release the CW spaces in the buffer memory 610 to be utilized again by a future operation. After the page program is complete (i.e. the CWs are stored at physical locations at the non-volatile memory 150), the channel controller 460 may indicate to the FRB 400 that the command corresponding to the WrTag is complete and the FRB 400 may forward the initial physical location of the LBN(s) in the non-volatile memory 150 and the WrTag associate with it to the controller processor 430. The controller processor 430 may utilize this information to update the LtoP table in the volatile memory 140. The FRB 400 may also return the utilized CW indexes to the CW pool 612 to be reused at a later point.

According to an embodiment of the present invention, during a host read operation, the FRB 400 receives an LBN read request from the controller processor 430, which includes, for example, a read tag (RdTag) assigned to the request by the controller processor 430, the LBN(s) of the data to be read from the non-volatile memory 150, the CW data size (which may depend on the code rate), and the CW offset within the memory page. At about the same time (e.g., concurrently), the controller processor 430 may send the read command to the channel controller 460, which, according to an embodiment, may have no knowledge of the location in the buffer memory 610 to which to transfer the data. Thus, the read command to the channel controller 460 may indicate the physical location of the page storing the first CW to be read, the number of CWs, the size of the CWs and the RdTag. As the channel controller 460 sends a read command to the non-volatile memory 150, the FRB 400 (e.g., the read engine 604) requests the appropriate (e.g., sufficient) number of CW indexes from the CW pool 612 to satisfy the data read. The read engine 604 then links the CW indexes provided by the CW pool 612 to the corresponding LBNs and to the RdTag.

In an embodiment, once the channel controller 460 has data available to transfer to the FRB 400, it sends a request to the FRB 400 indicating the RdTag (e.g., indicating only the RdTag). The FRB 400 stores the data from the channel controller 460 in the correct locations within the buffer memory 610 based on the CW indexes provided by the CW pool 612.

In an embodiment, once the transfer from channel controller 460 is completed, the FRB 400 (e.g., the read engine 604) sends a request to the host controller 410 to send the respective LBNs to the host 110. Once acknowledged, the read engine 604 disassembles the received CWs into logical blocks (e.g., extracts the logical blocks from the received CWs) and sends the logical blocks to the host 110. Disassembling the received CWs into logical blocks may include sending, by the read engine 604, a request to the ECC engine 420 to decode the CWs and to check for any errors, unpacking the payloads from the CWs and packaging them as logical blocks. The read engine 604 then sends a request to the host controller 410 to transfer the logical blocks to the host 110. Once the host 110 is ready to receive the data, the read engine 604 sends the logical blocks to the host controller 410 to transfer to the host 110. Once the data transfer to the host 110 is complete, the FRB 400 (e.g., the read engine 604) returns the associated CW indexes to the CW Pool 612 to be utilized again in a later operation. The read engine 604 may also send the list of LBNs indicating the status of the completion of the LBN transfer.

According to an embodiment of the present invention, the FRB 400 utilizes write streams during a write operation. Further, in order to reduce (e.g., minimize) processing load (e.g., write overhead) on the controller processor 430, the FRB 400 may manage the host write stream process. In a host write operation, the controller processor 430 selects a block stripe (BS) (e.g., BS0) that is ready to be written to (e.g., a block stripe that was previously erased) and provides the corresponding block stripe number to the FRB 400 to be utilized by the write stream engine 602. The controller processor 430 may also provide information on invalid memory blocks (e.g., blocks that should not be written to) and on how many memory pages fit in a block stripe. The incoming data from the host 110 may be transferred to the FRB 400 (e.g., transferred to the buffer memory 610) as described above with reference to FIG. 6. The write stream engine 602 of the FRB 400 then creates a link between the LBNs corresponding to the incoming host data (e.g., host LBNs) and the data location in the Buffer memory 610. The write stream engine 602 assigns the host LBNs to a physical location in the non-volatile memory 150 (e.g., a particular page stripe in the available block stripe) and keeps track of the relation between the host LBNs and the blocks in memory. Once enough data has accumulated in the buffer memory 610 to occupy a page in the nonvolatile memory 150, the write stream engine 602 sends a command to the channel controller 460 to program (e.g., to store or write to) the first page of the selected available block stripe (e.g., page0 of die0 of said block stripe). In an embodiment, the command includes a tag (e.g., WrTag) that is utilized by the channel controller 460 to request the data (e.g., the host data stored in the buffer memory 610) to be written to the non-volatile memory 150 from the FRB 400. The write stream controller 602 may also send the list of LBNs associated with the tag to the controller processor 430.

The tag may simplify the communication between the controller processor 430, FRB 400, and channel controller 460 as there may be no need to send the locations of the data in the buffer memory 610 to any block outside of the FRB 400. Thus, by using tags, no block other than the FRB 400 may be aware of the location of data in the buffer memory 610.

In an embodiment, once the channel controller 460 completes the write command (e.g., stores the data to the non-volatile memory 150), the channel controller 460 sends a write complete status signal to the controller processor 430 and the write stream engine 602. The status signal may include the tag corresponding to the write command. Using the tag, the controller processor 430 may update the LtoP table, which is stored in the volatile memory 140, and the write stream engine 602 may release the space allocated to the transferred host data (e.g., add the CW indexes of the released CW spaces to the CW memory 614) for future utilization.

According to an embodiment of the present invention, the write stream engine 602 may communicate with the ECC engine 420 to encode CWs and select a different level of ECC protection for each memory page in the stream, depending on the quality and/or state of memory pages (or memory blocks) in the non-volatile memory 150. For example, the write stream engine 602 may allocate a higher number of parity bits (and, e.g., a lower number of payload bits) to a CW that will be stored in a memory block that is worn out (e.g., has been written to a large number of times). Thus, the FRB 400 is capable of handling the variations of quality between memory blocks and between pages within a same memory block. In an embodiment, the FRB 400 may vary the size of (e.g., the number of bits allocated to) the payload and/or the ECC depending on a requisite protection level, which may be determined based on the type (e.g., kind) of data being stored in the non-volatile memory 150. For example, in an embodiment in which data integrity is of critical concern, the FRB 400 may allocate a higher number of parity bits to each CW in order to achieve a greater level of data protection.

According to an embodiment, the write stream engine 602 may skip (e.g., not write to) dies, memory blocks, and/or memory pages that have been marked by the controller processor 430 as invalid and/or inactive. The controller processor 430 may notify the FRB 400 of the invalid/inactive region(s) when it allocates the memory block to be written to.

According to an embodiment, the controller processor 430 programs the FRB 400 with a number of parameters including, for example, CW size, CW code rate, the number of pages in a page stripe. The controller processor 430 may program these parameters at any point (e.g., for every new page stripe during a write operation).

According to an embodiment of the present invention, the FRB 400 may perform garbage collection tasks in tandem with or in lieu of the controller processor 430. By performing garbage collection (e.g., reclaiming/de-allocating memory space in the non-volatile memory 150 that is no longer utilized by the host 110), the FRB 400 may reduce (e.g., significantly reduce) the processing load that is placed on the controller processor 430, which may lead to increased (e.g., improved) system performance.

In an embodiment, the FRB 400 manages the garbage collection process. Thus, garbage collection may be performed in a manner that is substantially (e.g., completely) transparent to the controller processor 430. In an example, the controller processor 430 initiates the garbage collection process. Depending on the workload from the host 110, the memory blocks, which are candidates for being erased (and, e.g., reclaimed), may contain valid information. If this valid information is erased, a loss of host data may occur. Therefore, it is desired for this valid data to be read and written to a new block (e.g., a block that was previously erased).

In a garbage collection operation, the controller processor 430 may send, to the garbage collection (GC) engine 606, the valid LBNs in a block stripe, which is to undergo garbage collection, along with an associated tag for a read operation (e.g., a RdTag) from the same block stripe in the non-volatile memory 150. The GC engine 606 may allocate sufficient space in the buffer memory 610 to receive the data associated with the valid LBNs and may also create the link between the valid LBNs, data location in the buffer memory 610, and the RdTag. The channel controller 460 reads the data corresponding to the valid LBNs from the non-volatile memory 150 one page at a time and, using the RdTag, sends a request to the FRB 400 to transfer the data to the buffer memory 610. Based on the RdTag, the GC engine 606 may determine the location to which the data has to be stored in the buffer memory 610. After a logical block of the valid data is stored in the buffer memory 610, the GC engine 606 adds the logical block to the GC write stream. The GC engines 606 assembles the logical block (similar to a Host data read) and allocates new CW indexes to store the logical block, where the new CW indexes are associated with the GC write stream.

Once enough data has accumulated in the buffer memory 610 to occupy a page in a new block stripe of the nonvolatile memory 150, the GC engine 606 sends a command to the channel controller 460 to program (e.g., to store or write to) the page. In an embodiment, the command includes a tag (e.g., a WrTag) that is utilized by the channel controller 460 to request the data (e.g., the host data stored in the buffer memory 610) to be written to the non-volatile memory 150 from the FRB 400. The GC engine 606 may also send the list of LBNs associated with the tag to the controller processor 430.

Once the channel controller 460 completes the write command (e.g., stores the data to new block stripe of the non-volatile memory 150), the channel controller 460 sends a write complete status signal to the controller processor 430 and the GC engine 606. The status signal may include the tag corresponding to the write command. Using the tag, the controller processor 430 may update the LtoP table, which is stored in the volatile memory 140, and the GC engine 602 may release the space allocated to the transferred host data (e.g., add the CW indexes of the released CW spaces to the CW memory 614) for future utilization.

According to an embodiment of the present invention, the GC engine 606 may communicate with the ECC engine 420 to encode/decode CWs and select a different level of ECC protection for each memory page in the stream, depending on the quality and/or state of memory pages and/or blocks in the non-volatile memory 150. For example, the GC engine 606 may allocate a higher number of parity bits to a CW that will be stored in a die or memory page that is worn out (e.g., has been written to a large number of times). Thus, the GC engine 606 is capable of handling the variations of quality between memory blocks and between pages within a same memory block.

According to an embodiment, the GC engine 606 may skip (e.g., not write to) dies, memory blocks, and/or memory pages that have been marked by the controller processor 430 as invalid and/or inactive. The controller processor 430 may notify the FRB 400 of the invalid/inactive region(s) when it allocates the memory block to be written to.

According to an embodiment of the present invention, the SSD 120 may internally organize the logical blocks (LBs) into controller logical blocks (CLBs), which include one or more logical blocks. For example, if a logical block is about 4 KB in size, the CLB may be about 4 KB, about 8 KB, about 16 KB, or the like, in size. In one example, an about 8 KB CLB may represent two sequentially organized logical blocks, and CLB 0 may, for example, include LB0 and LB1.

Organizing two or more logical blocks into one CLB may reduce (e.g., minimize) the size of the LtoP table, thus reducing the size requirement of the volatile memory 140. However, host write commands for data smaller than the size of the CLB may have to be handled using a read-modify-write (RMW) operation. For instance, if, in the example above, the host 110 sends a write command for a host sector corresponding to only LB3, the controller 130 reads LB2, which together with LB3 makes up CLB1, from the non-volatile memory 150, incorporates (e.g., merges) the read LB2 with the new LB3 to form (e.g., generate) a new CLB1, and then writes the entire new CLB1 (i.e., LB2 and new logical block 3) back to the non-volatile memory 150. In an embodiment, a RMW operation is performed every time a write command includes a partial CLB (e.g., if the command is to only write to a part, and not all, of a CLB).

According to an embodiment of the present invention, the controller 130 may utilize the FRB 400 to accelerate the RMW process. When the controller 130 receives a write command from the host 110, the controller processor 430 may determine, based on, for example, the relative sizes of the host logical blocks and the data blocks and the number of host logical blocks to be written to a data block, whether a RMW operation may be performed and directs the FRB 400 accordingly. In performing a RMW operation, the FRB 400 may utilize the read engine 604 and the write stream engine 602 to read data from and write data to, respectively, the non-volatile memory 150. The FRB 400 may be configured to support any controller logical block size. In an embodiment, the controller processor 430 may define the host sector, logical block, and CLB sizes through a configuration register.

Figure 7A:
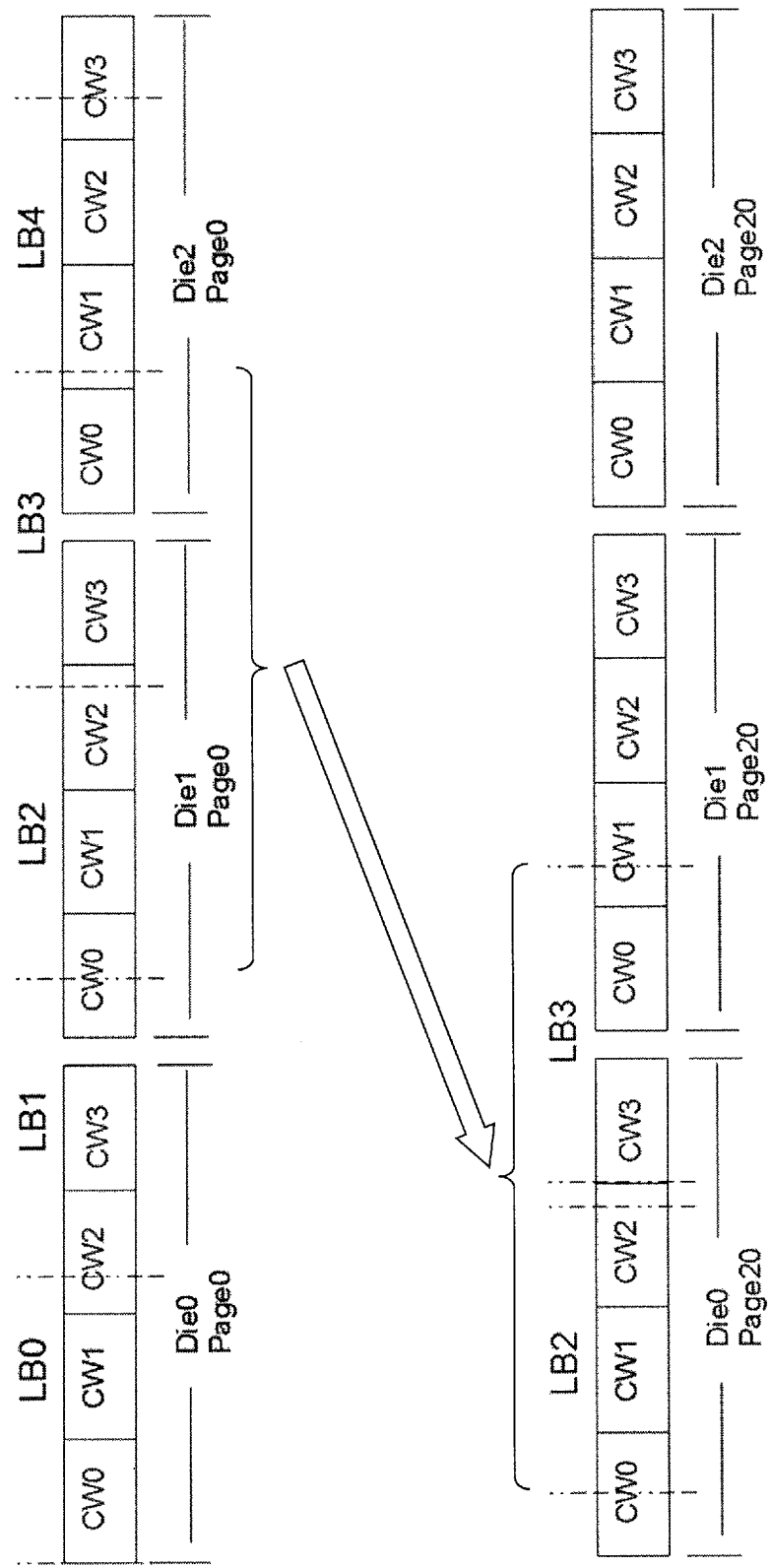
FIG. 7A is a block diagram illustrating the performance of a read-modify-write operation by the FRB without reassembling logical blocks before writing them to the non-volatile memory, according to an illustrative embodiment of the present invention.

FIG. 7A is a block diagram illustrating the performance of a read-modify-write operation by the FRB 400 without reassembling LBs before writing them to the non-volatile memory 150, according to an illustrative embodiment of the present invention. In an embodiment, when the FRB 400 retrieves codewords corresponding to a logical block of a CLB, a logical block of which is being modified by a host write, the FRB 400 does not disassemble the CWs to extract the data stored therein and does not combine the data from the payload of the codewords with the host data before storing the logical blocks of the CLB back to the non-volatile memory 150. Rather, the FRB 400 simply copies the retrieved codewords to a new location in the non-volatile memory 150 along with codewords representing the new logical block (which is modified by the host write command). For instance, in the example described above with reference to FIG. 7A, in reading LB2 from memory, the FRB 400 retrieves codewords CW0, CW1, and CW2 of die1 of page stripe0, and combines the codewords with those representing the new LB3 and writes the combination to die0 and die1 of page stripe20. As such, the LB2 may occupy the codewords CW0-CW2 of die0 in page stripe20 and LB3 will occupy the following three codewords, which may be CW3 of die1 in page stripe20 and CW0 and CW1 of dies2 in page stripe20. Accordingly, as illustrated in FIG. 7B, the codewords written to the new location (e.g., CW0 and CW2 of die0 and CW1 of die2 in page stripe20) may not be fully utilized for storing the logical blocks LB2 and LB3 (e.g., may only be partially utilized to store the logical blocks LB2 and LB3), and thus, memory space may not be utilized effectively.

Figure 7B:
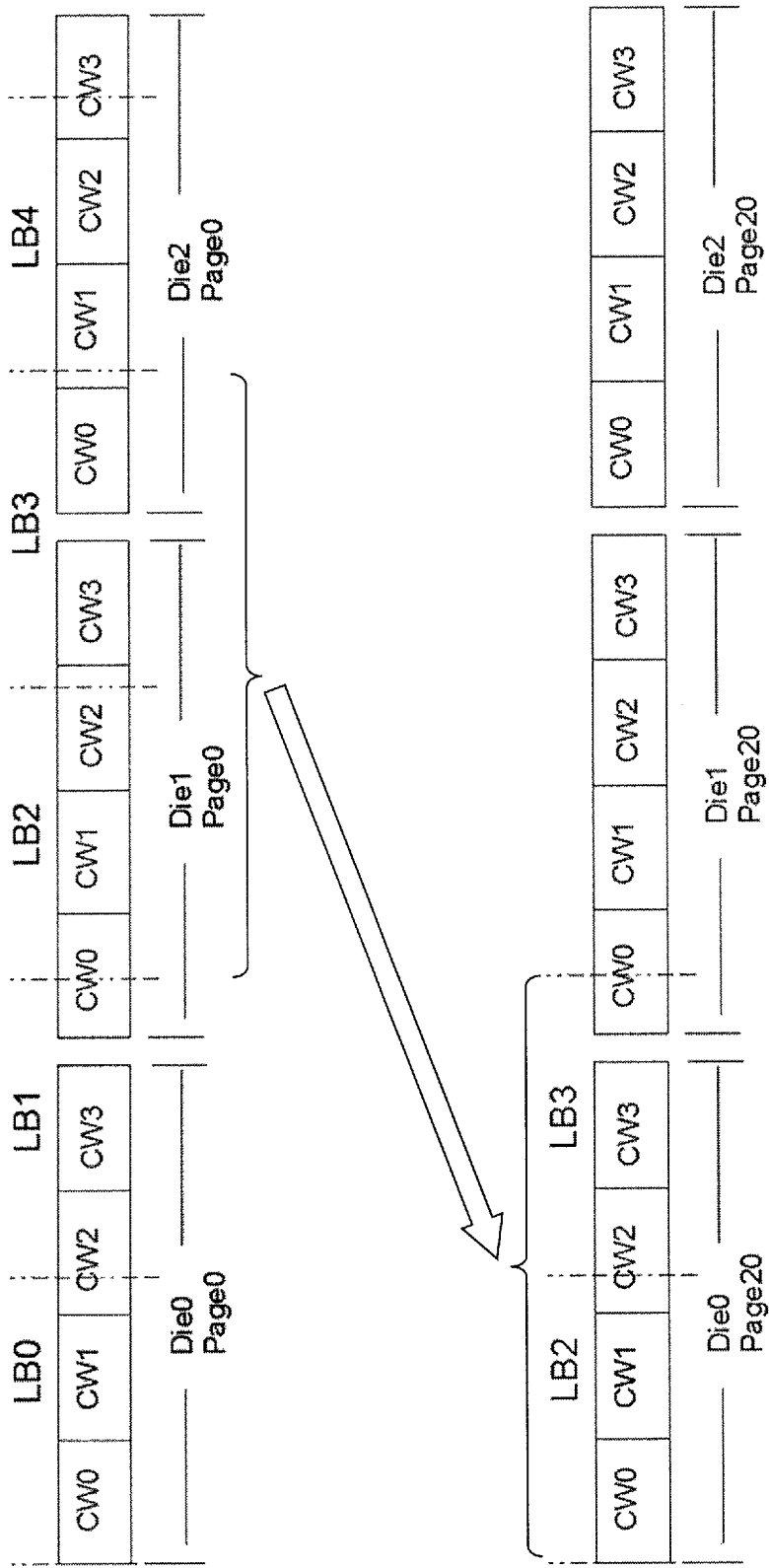
FIG. 7B is a block diagram illustrating the performance of a read-modify-write operation by the FRB utilizing the reassembling of logical blocks before writing them to the non-volatile memory, according to an illustrative embodiment of the present invention.

FIG. 7B is a block diagram illustrating the performance of a read-modify-write operation by the FRB 400 utilizing the reassembling of logical blocks before writing them to the non-volatile memory 150, according to an illustrative embodiment of the present invention. In an embodiment, when the FRB 400 retrieves codewords corresponding to a logical block, the FRB 400 extracts the payloads from each of codewords, reassembles (e.g., reconstructs) the data stored therein, combines the reassembled data with that of a new logical block to be written, re-encodes the combined data into a new set of codewords and writes the new codewords into a new location (e.g., new stripe) in the non-volatile memory 150. For instance, in the example described above with respect to FIG. 7B, when the host 110 sends a write request for host sector 3 (corresponding to LB3 and CLB1), the FRB 400 retrieves CW0-CW2 of die1 of page stripe0 corresponding to LB2, the FRB 400 extracts the data stored in CW0-CW2, combines the extracted data with the host data to be stored in LB3, encodes LB2 and LB3 into five codewords, and stores the codewords in a page stripe of the non-volatile memory 150. In this manner, LB2 and LB3 only occupy CW0-CW3 of die0 and CW0 of die1 of page stripe 20. Thus, in this example, by reassembling the read logical block, the memory space utilized to store the modified CLB (e.g., CLB1) may be reduced (e.g., by one codeword) as compared to a read-modify-write process that does not utilize reassembling.

Further, in an embodiment, the FRB 400 encodes the combined data based on the quality and/or state of the destination memory pages in the non-volatile memory 150. Thus, for example, the number of bits allocated to the parity sections of the new CWs may differ from those of the retrieved CWs.

Figure 8:
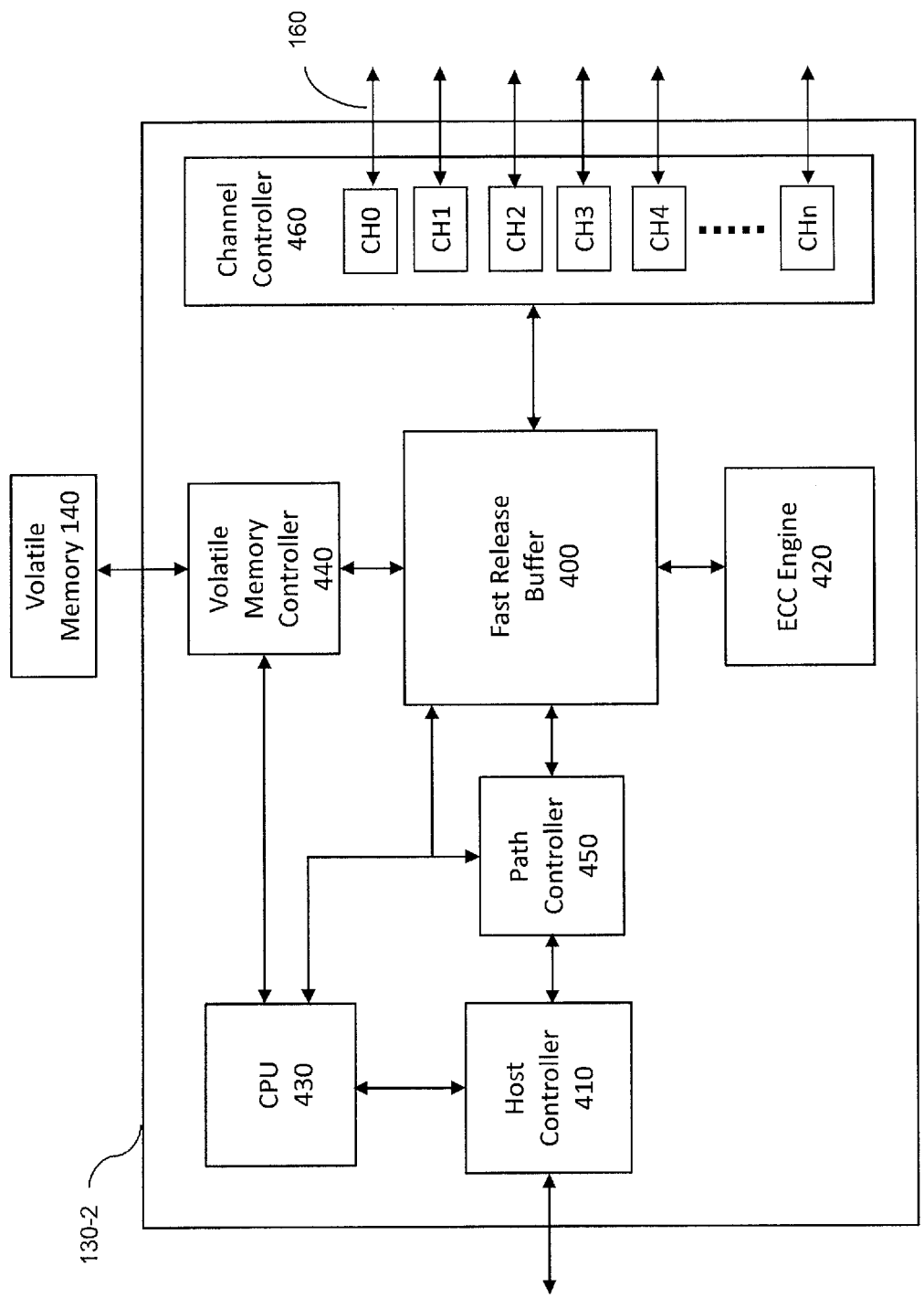
FIG. 8 is a block diagram of a SSD controller utilizing a path controller, according to an illustrative embodiment of the present invention.

FIG. 8 is a block diagram of a SSD controller 130-2 utilizing a path controller 450, according to an embodiment of the present invention. The path controller 450 may route data traffic to and from the host controller 410 and the FRB 400. During a RMW write operation, the controller processor 430 may utilize the path controller 450 to maintain the write flow consistent with a normal write operation, from the perspective of the FRB 400. In a RMW operation in which a logical block of a CLB is to be modified, the controller processor 430 may direct the path controller 450 to receive the new logical block to be written to the CLB from the host controller 410 and may direct the FRB 400 to read the remaining logical blocks of the CLB (e.g., all logical blocks of the CLB with the exception of the logical block to be modified) from the non-volatile memory 150, in a manner substantially similar to the read process described above with reference to FIGS. 4-6. The read logical blocks may be sent to the path controller 450, as may occur in a host read operation. The controller processor 430 may then direct the path controller 450 to organize and send to the FRB 400 the read logical blocks and the new logical block to be written to the non-volatile memory 150. The controller processor 400 may then direct the FRB 400 to write the logical blocks received from the path controller 450 to the non-volatile memory 150, in a manner substantially similar to the write process described above with reference to FIGS. 4-6.

According to an embodiment, the path controller 450 is distinct and separate from (e.g., physically and functionally separate from) the FRB 400 and is not integrated with the FRB 400. According to an embodiment, the path controller 450 may be combined with (e.g., integrated with) the host controller 410, and/or the host controller 410 may perform the same, or substantially similar, functions as those attributed to path controller 450 in the description above.

Figure 9:
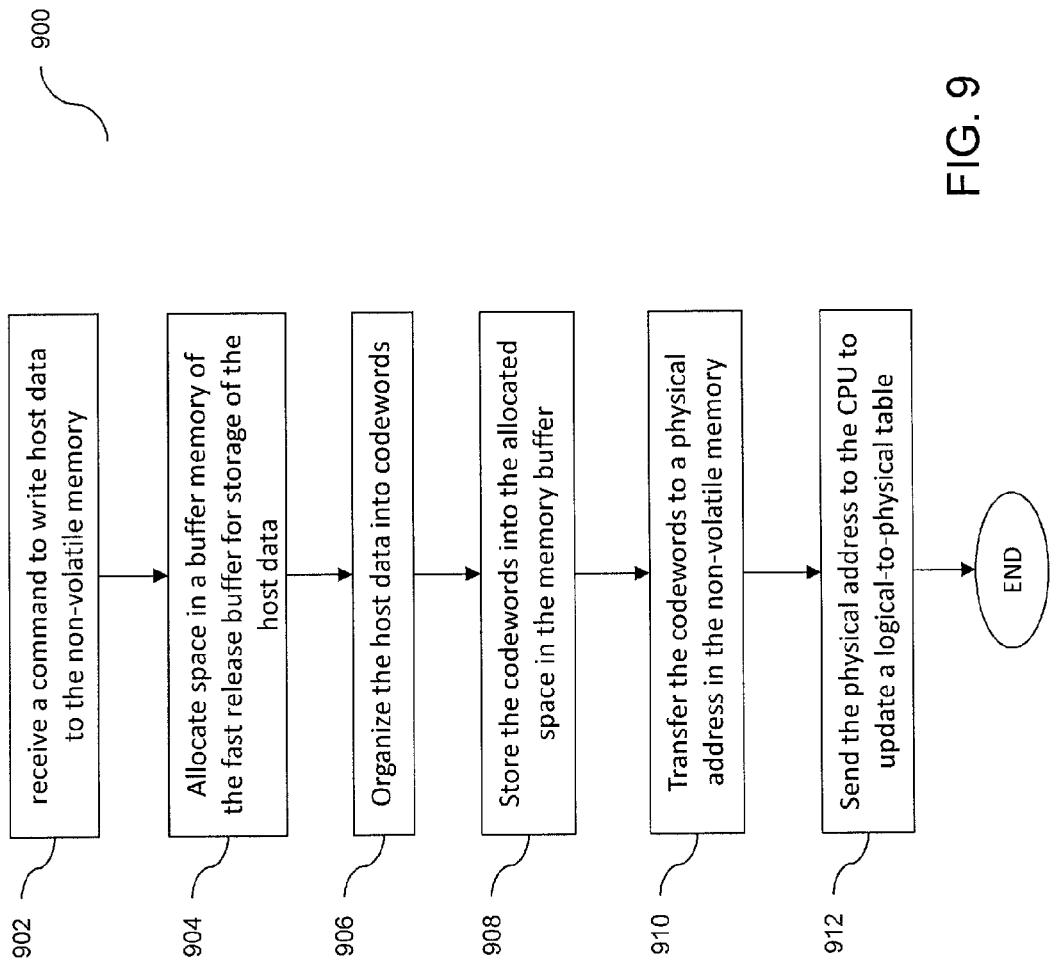
FIG. 9 is a flow diagram of a process for writing host data to a SSD, according to an illustrative embodiment of the present invention.

FIG. 9 is a flow diagram of a process 900 for writing host data to a SSD 120, according to an illustrative embodiment of the present invention.

At act 902, the FRB 400 receives, from the CPU 430, a command to write the host data to the non-volatile memory 150. The host data is associated with a logical block number (LBN) of the controller 130. The command may include one or more of a size of each codeword (CW) of the one or more CWs, a code rate of the CWs (e.g., a size ratio of the payload section to the CW), and number of pages in a page stripe 170 of the non-volatile memory 150.

At act 904, the FRB 400 allocates space in a buffer memory 610 of the FRB 400 for storage of the host data. In an embodiment, the FRB 400 determines a count N of CW spaces sufficient to store the host data in the buffer memory 610. The FRB 400 then retrieves N CW indexes from the CW pool 612 on a first-in-first-out basis (FIFO) and removes the N CW indexes from the CW pool 612. The FRB 400 may also associate the N CW indexes with the host data.

At act 906, the FRB 400 organizes the host data into one or more codewords (CWs). In an embodiment, the FRB 400 divides the host data into one or more payload sections and encodes the one or more payload sections to generate the one or more CWs. The FRB 400 may instruct the ECC engine 420 to encode the one or more payload sections and to generate one or more parity sections (e.g., error correction codes or coded sections), which may include one or more parity bits. The FRB 400 may receive the one or more parity sections from the ECC engine 420, each parity section of the one or more parity sections corresponding to a payload section of the one or more payload sections. The FRB 400 may then combine each of the one or more payload sections with the corresponding one of the one or more parity sections to generate the one or more CWs.

According to an embodiment, the FRB 400 varies (e.g., adjusts) a size of each of the one or more payload sections and instructs the ECC engine 420 to vary a size of each of the corresponding one or more parity sections based on one or more parameters including a state of the non-volatile memory 150 at the physical address and a requisite protection level determined by a type (e.g., kind) of host data to be stored in the non-volatile memory 150.

At act 908, the FRB 400 stores the one or more CWs into the allocated space in the buffer memory. In so doing, the FRB 400 copies (e.g., writes) the host data into the N CW spaces of the buffer memory 610 that are associated with the retrieved CW indexes.

At act 910, the FRB 400 transfers the one or more CWs from the buffer memory to a physical address in the non-volatile memory 150. In an example, the transfer occurs when a number of the CWs stored in the buffer memory exceeds a value corresponding to the size of a flash memory page. In an embodiment, the channel controller 460 may request the one or more CWs from the buffer memory 610 of the FRB 400 and write the one or more CWs to the physical address in the non-volatile memory 150. After the transfer is complete, the FRB 400 may de-allocate the allocated space in the buffer memory 610 by returning (e.g., adding) the removed N CW indexes to the CW pool 612.

At act 912, the FRB 400 sends the LBN and the physical address to the CPU 430 to update a logical-to-physical table in the volatile memory of the storage device.

Figure 10:
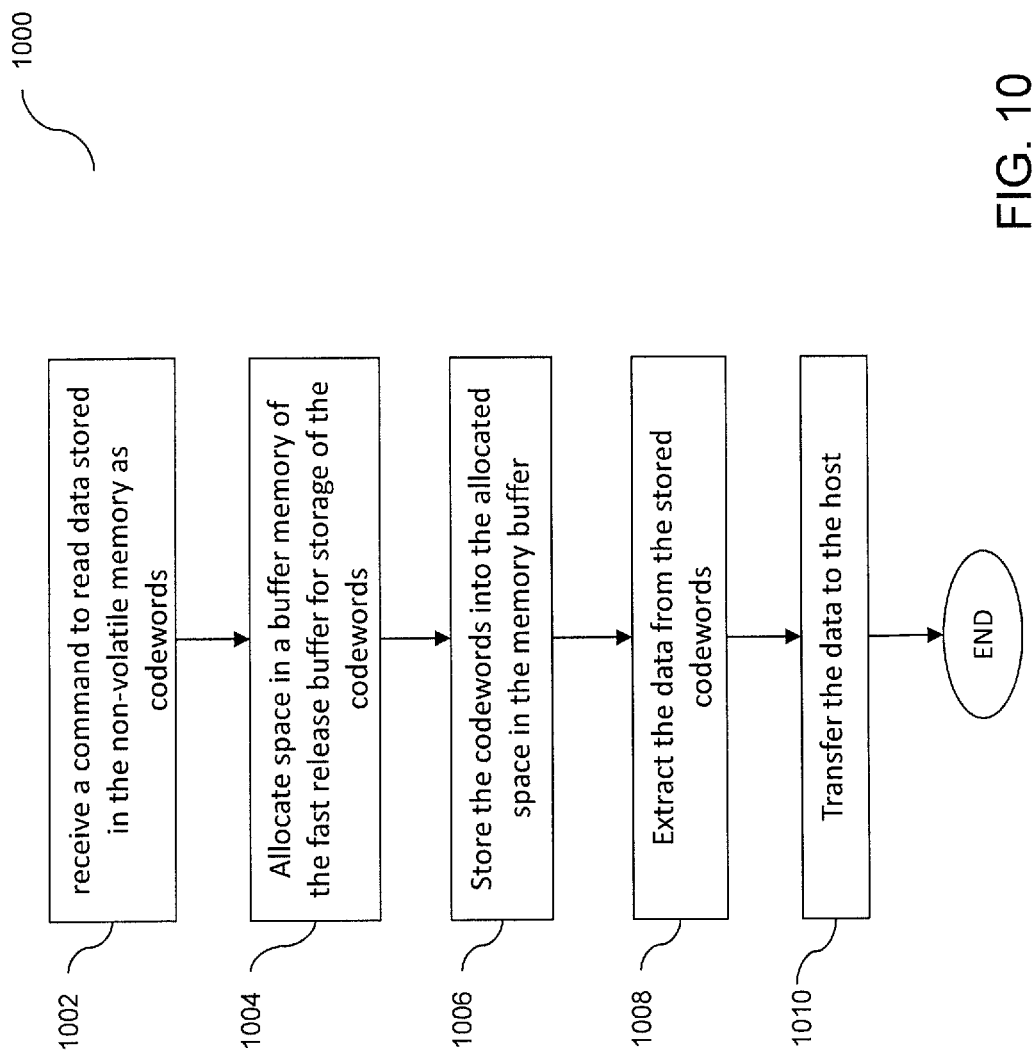
FIG. 10 is a flow diagram of a process for reading data from a SSD to send to the host, according to an illustrative embodiment of the present invention.

FIG. 10 is a flow diagram of a process 1000 for reading data from a SSD 120 to send to the host 110, according to an illustrative embodiment of the present invention.

At act 1002, the FRB 400 receives, from the CPU 430, a command to read data stored in the non-volatile memory 150. The data is stored in the non-volatile memory 150 as one or more CWs. The command may include one or more of a size of each CW of the one or more CWs, a code rate of the CWs, and number of pages in a page stripe 170 of the non-volatile memory 150, and a plurality of valid logical block numbers (LBNs) corresponding to a first one or more codewords (CWs) stored in the first block stripe.

At act 1004, the FRB 400 allocates space in a buffer memory of the FRB for storage of the one or more CWs. In an embodiment, the FRB 400 determines a count N of the one or more CWs. The FRB 400 then retrieves N CW indexes from the CW pool 612 on a first-in-first-out basis and removes the N CW indexes from the CW pool 612. The FRB 400 may also associate the N CW indexes with the host data. The FRB 400 then retrieves (e.g., reads) the plurality of CWs from a block stripe of the non-volatile memory 150 one codeword at a time.

At act 1006, the FRB 400 stores the one or more CWs into the allocated space in the buffer memory. In so doing, the FRB 400 copies (e.g., writes) the one or more CWs into the N CW spaces of the buffer memory 610 that are associated with the retrieved CW indexes.

At act 1008, the FRB 400 extracts the data from the stored one or more CWs. In an embodiment, the FRB 400 decodes the one or more CWs to generate one or more payload sections and corresponding one or more parity sections, which may include one or more parity bits. In so doing, the FRB 400 may instruct the ECC engine 420 to decode the one or more CWs and to generate the one or more payload sections and the corresponding one or more parity sections. The FRB then may receive the one or more payload sections from the ECC engine 420. In an embodiment, the FRB 400 combines the one or more payload sections to recreate the data.

At act 1010, the FRB 400 transfers the data to the host. In an embodiment, the host controller 410 may request the data from the FRB 400 and forward (e.g., send) the data to the host 110. After the transfer is complete, the FRB 400 may de-allocate the allocated space in the buffer memory 610 by returning (e.g., adding) the removed N CW indexes to the CW pool 612.

Figure 11:
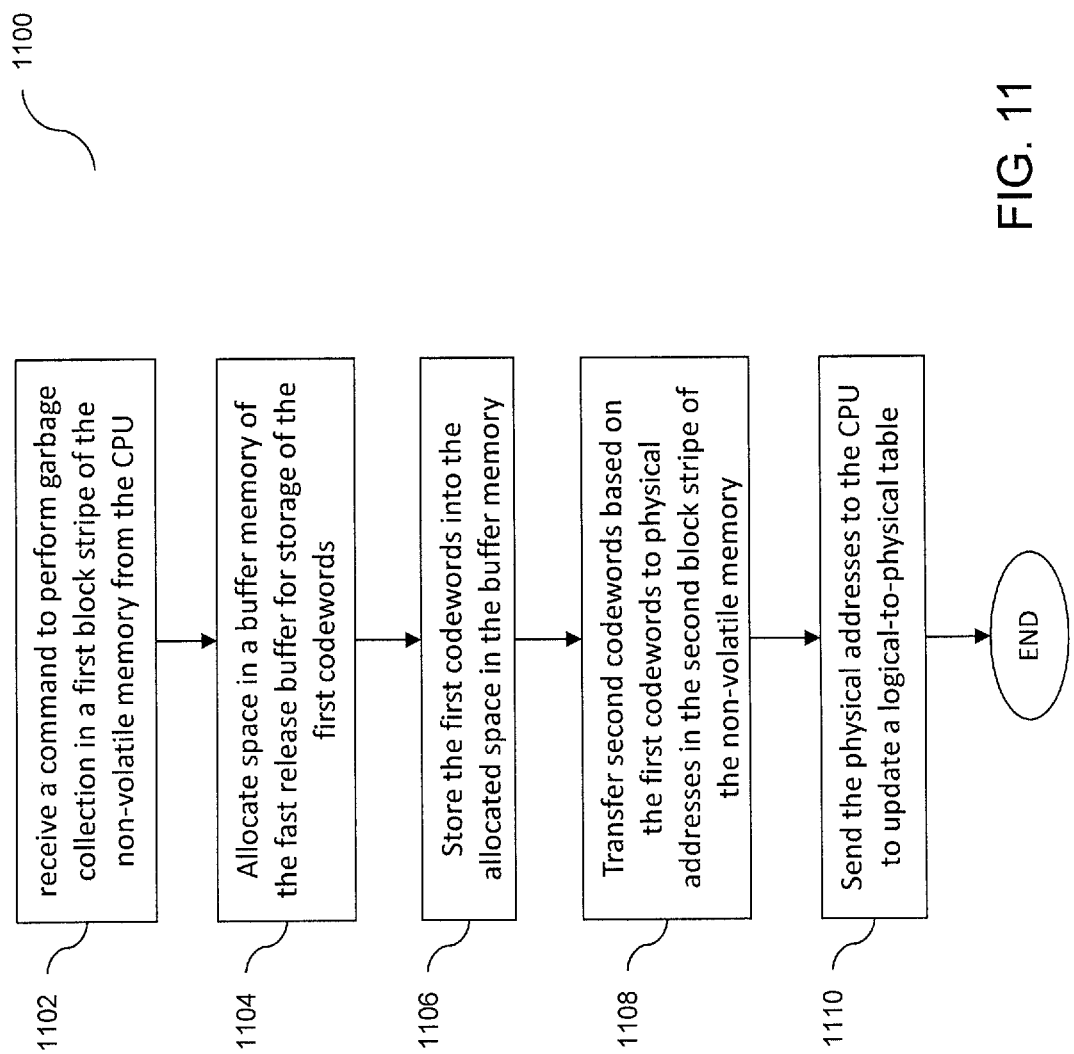
FIG. 11 is a flow diagram of a process for performing garbage collection in the SSD, according to an illustrative embodiment of the present invention.

FIG. 11 is a flow diagram of a process 1100 for performing garbage collection in the SSD 120, according to an illustrative embodiment of the present invention.

At act 1102, the FRB 400 receives by a command to perform garbage collection in a first block stripe of the nonvolatile memory 150 from the controller processor 430. The data is stored in the non-volatile memory 150 as one or more CWs. The command may include one or more of a size of each CW of the one or more CWs, a code rate of the CWs, and a plurality of valid logical block numbers (LBNs) corresponding to a first plurality of codewords (CWs) stored in the first block stripe.

At act 1104, the FRB 400 allocates space in a buffer memory 610 of the FRB 400 for storage of the first plurality of CWs. In an embodiment, the FRB 400 determines a count N of the first and second plurality of CWs. The FRB 400 then retrieves N CW indexes from the CW pool 612 on a first-in-first-out basis and removes the N CW indexes from the CW pool 612. The FRB 400 may also associate the N CW indexes (e.g., associate at least the CW indexes corresponding to the first plurality of CWs) with the valid LBNs. According to an embodiment, the plurality of CW indexes is added to the CW pool 612 at time of initialization of the storage device 120. The FRB 400 then retrieves (e.g., reads) the plurality of CWs from the first block stripe of the non-volatile memory 150 one codeword at a time.

At act 1106, the FRB 400 stores the first plurality of CWs into the allocated space in the buffer memory 610. In an example, the FRB 400 copies (e.g., writes) the one or more CWs into the N CW spaces of the buffer memory 610 that are associated with the retrieved CW indexes. According to an embodiment, the FRB 400 further extracts data from the stored first plurality of CWs and organizes the data into a second plurality of CWs, which are based on the first plurality of CWs. For example, the second plurality of CWs is the same as the first plurality of CWs. The FRB 400 then stores the second plurality of CWs into the allocated space in the buffer memory 610.

According to an embodiment, the FRB 400 extracts the data by instructing an error correction code (ECC) engine 420 to decode the first plurality of CWs and to generate a first plurality of payload sections and a corresponding first plurality of parity sections, receiving the first plurality of payload sections from the ECC engine 420, and combining the first plurality of payload sections to recreate the data.

According to an embodiment, the FRB 400 organizes the data into a second plurality of CWs by dividing the data into a second plurality of payload sections, instructing the ECC engine 420 to encode the second plurality of payload sections and to generate a second plurality of parity sections (which correspond to the second plurality of payload sections), receiving the second plurality of parity sections from the ECC engine 420 and combining each of the second plurality of payload sections with the corresponding one of the second plurality of parity sections to generate the second plurality of CWs. In an example, each of the second plurality of parity sections includes one or more parity bits.

In an embodiment, the FRB 400 varies (e.g., adjusts or modifies) a size of each payload of the second plurality of payload sections and instructs the ECC engine 420 to vary a size of each of the second plurality of parity sections based on one or more parameters including a state of the non-volatile memory 150 at the second block stripe. The state of a memory block in a block stripe may be indicated by how worn the memory block is, for example, the number of times the memory block has been written/programmed to and/or erased (e.g., the number of program/erase (P/E) cycles).

At act 1108, the FRB 400 transfers a second plurality of CWs to a plurality of physical addresses in the second block stripe of the non-volatile memory 150. In an embodiment, the second plurality of CWs is based on the first plurality of CWs. According to an embodiment, the transferring of the second plurality of CWs occurs when a size of the CWs stored in the buffer memory exceeds a size of a flash memory page. In an embodiment, the transferring of the second plurality of CWs includes writing the second plurality of CWs to memory dies 152 of the second block stripe that are identified as valid (e.g., not marked as invalid) by the CPU 430.

After the transfer is complete, the FRB 400 may de-allocate the allocated space in the buffer memory 610 by returning (e.g., adding) the removed N CW indexes to the CW pool 612.

At act 1110, the FRB 400 sends the plurality of valid LBNs and the plurality of physical addresses to the CPU 430 to update a logical-to-physical table in the volatile memory 140 of the SSD 120.

FIG. 12 is a flow diagram of a process 1200 for writing host data to a SSD 120 utilizing a read-modify-write process, according to an illustrative embodiment of the present invention.

At act 1202, the FRB 400 receives a command from the controller processor 430 to write the host data to a location in the non-volatile memory 150. The host data is associated with a first plurality of codewords (CWs). The host data may correspond to a logical block of a CLB including a plurality of logical blocks. The other logical blocks of the CLB (e.g., all logical blocks except for the one corresponding to the host data) are stored as a first plurality of codewords in the non-volatile memory 150.

At act 1204, the FRB 400 allocates space in a buffer memory 610 of the FRB 400 for storage of the first plurality of CWs. In an embodiment, the FRB 400 determines a count N of the first plurality of CWs. In another embodiment, the FRB 400 determines a count N of the first plurality of CWs and the CW spaces sufficient to store the host data in the buffer memory 610. The FRB 400 then retrieves N CW indexes from the CW pool 612 on a first-in-first-out basis and removes the N CW indexes from the CW pool 612.

At act 1206, the FRB 400 stores the first plurality of CWs into the allocated space in the buffer memory. In doing so, the FRB 400 may store the first plurality of CWs into N CW spaces of the buffer memory that are associated with the retrieved N CW indexes.

At act 1208, the FRB 400 extracts data from the stored first plurality of CWs. In an embodiment, the FRB 400 instructs the ECC engine 420 to decode the first plurality of CWs and to generate a first plurality of payload sections and a corresponding first plurality of parity sections, which may include one or more parity bits. The FRB 400 may receive the first plurality of payload sections from the ECC engine 420 and combine the first plurality of payload sections to recreate the data.

At act 1210, the FRB 400 organizes the extracted data and the host data into a second plurality of CWs. In an embodiment, the FRB 400 receives the host data from a path controller 450 or the host controller 410, organizes the host data and the extracted data in a sequence (e.g., in an order based on the LBN of the corresponding logical blocks) to generate a data block, and encodes the data block into the second plurality of CWs. According to another embodiment, the FRB 400 sends the extracted data to a path controller 450 (or the host controller 410), receives a command from the controller processor 430 to write a data block including the extracted data and the host data to the non-volatile memory 150, receives the data block from the path controller 450 (or the host controller 410), and encodes the data block into the second plurality of CWs. The path controller 450 (or the host controller 410) may organize the host data and the extracted data in a sequence (e.g., in an order based on the LBN of the corresponding logical blocks) to generate the data block.

According to an embodiment, the FRB 400 encodes the data block by dividing the data block into a second plurality of payload sections, instructing the ECC engine 420 to encode the second plurality of payload sections and to generate a second plurality of parity sections, receiving the second plurality of parity sections from the ECC engine 420, in which each parity section of the second plurality of parity sections corresponding to a payload section of the second plurality of payload sections, and combines each payload section of the second plurality of payload sections with the corresponding one of the second plurality of parity sections to generate the second plurality of CWs.

According to an embodiment, the FRB 400 varies (e.g., adjusts) the size of each payload section of the second plurality of payload sections and instructs the ECC engine 420 to vary a size of each parity section of the second plurality of parity sections based on one or more parameters including a state of the non-volatile memory 150 at the plurality of physical addresses and a requisite protection level determined by a type (e.g., kind) of host data to be stored in the non-volatile memory 150.

At act 1212, the FRB 400 transfers a second plurality of CWs to a plurality of physical addresses in the non-volatile memory 150. In an embodiment, the channel controller 460 may request the data from the FRB 400 and program (e.g., write) the data to the non-volatile memory 150. After the transfer is complete, the FRB 400 may de-allocate the allocated space in the buffer memory 610 by returning (e.g., adding) the removed N CW indexes to the CW pool 612. According to an embodiment, the channel controller 460 skips (e.g., does not write to) to memory dies 152 of the non-volatile memory 150 that are marked as invalid by the controller processor 430.

At act 1214, the FRB 400, sends the LBNs of the logical blocks corresponding to the second plurality of CWs and the plurality of physical addresses to the controller processor 430 to update a logical-to-physical table in the volatile memory 140 of the SSD 120.

Other embodiments are within the scope and spirit of the present invention. For example, the functionality described above can be implemented using software, hardware, firmware, hardwiring, or combinations thereof. One or more computer processors operating in accordance with instructions may implement the FRB 400 related functions in accordance with the present invention as described above. It is within the scope of the present invention that such instructions may be stored on one or more non-transitory processor readable storage media (e.g., a magnetic disk, non-volatile random-access memory, phase-change memory or other storage medium). Additionally, modules implementing functions may also be physically located at various positions, including being distributed such that portions of functions are implemented at different physical locations.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art will recognize that its usefulness is not limited thereto and that the present invention may be beneficially implemented in any number of environments for any number of purposes. Accordingly, the claims set forth below should be construed in view of the full breadth and spirit of the present invention as described herein and equivalents thereof.

What is claimed is:

1. A method of reading host data from a storage device comprising a central processing unit (CPU), a self-organized fast release buffer (FRB), and a non-volatile memory, the storage device being in communication with a host, the method comprising:
    receiving, by the FRB, a command to read host data stored in the non-volatile memory from the CPU, the host data being stored in the non-volatile memory as one or more codewords (CWs), the command comprising a read tag;
    allocating space, by the FRB, in a buffer memory of the FRB for storage of the one or more CWs;
    storing, by the FRB, the one or more CWs into the allocated space in the buffer memory;
    extracting, by the FRB, the host data from the stored one or more CWs; and
    transferring, by the FRB, the host data to the host,
    wherein the buffer memory comprises a plurality of codeword (CW) spaces, each CW space of the plurality of CW spaces being associated with a CW index of a plurality of CW indexes, the CW indexes being stored in a CW pool of the FRB,
    wherein the allocating of the space in the buffer memory comprises:
        determining, by the FRB, a count N of the one or more CWs,
        retrieving, by the FRB, N CW indexes from the CW pool on a first-in-first-out basis;
        removing, by the FRB, the N CW indexes from the CW pool; and
        associating, by the FRB, the N CW indexes with the host data and the read tag, and
    wherein the storing of the one or more CWs comprises:
        receiving, by the FRB, a request from a channel controller, the request comprising the read tag and indicating readiness to transfer the one or more CWs; and
        storing, by the FRB, the one or more CWs transferred from the channel controller into N CW spaces of the buffer memory that are associated with the retrieved N CW indexes and the read tag.

2. The method of claim 1, wherein the command comprises a size of each CW of the one or more CWs.

3. The method of claim 1, further comprising de-allocating, by the FRB, the allocated space in the buffer memory.

4. The method of claim 3, wherein the de-allocating of the allocated space in the buffer memory comprises adding, by the FRB, the removed N CW indexes to the CW pool.

5. The method of claim 1, wherein the plurality of CW indexes is added to the CW pool at time of initialization of the storage device.

6. The method of claim 1, wherein the extracting of the host data from the one or more retrieved CWs comprises:
    decoding, by the FRB, the one or more CWs to generate one or more payload sections and corresponding one or more parity sections; and
    combining, by the FRB, the one or more payload sections to recreate the host data.

7. The method of claim 6, wherein the decoding of the one or more payload sections comprises:
    instructing, by the FRB, an error correction code (ECC) engine to decode the one or more CWs and to generate the one or more corrected payload sections and the corresponding one or more parity sections;
receiving, by the FRB, the one or more corrected payload sections,
wherein bits of the one or more corrected payload sections are corrected by the ECC engine based on the one or more corresponding parity sections.

8. The method of claim 7, wherein each parity section of the one or more parity sections comprises one or more parity bits.

9. A storage device configured to transfer host data to a host in response to a host read request, the storage device comprising a central processing unit (CPU), a self-organized fast release buffer (FRB), and a non-volatile memory, the FRB comprising:
   a processor; and
   a memory having stored thereon instructions that, when executed by the processor, cause the processor to perform:
      receiving a command to read host data stored in the non-volatile memory from the CPU, the host data being stored in the non-volatile memory as one or more codewords (CWs), the command comprising a read tag;
      allocating space in a buffer memory of the FRB for storage of the one or more CWs;
      storing the one or more CWs into the allocated space in the buffer memory;
      extracting the host data from the stored one or more CWs; and
      transferring the host data to the host,
      wherein the buffer memory comprises a plurality of codeword (CW) spaces, each CW space of the plurality of CW spaces being associated with a CW index of a plurality of CW indexes, the CW indexes being stored in a CW pool of the FRB, and
      wherein the allocating of the space in the buffer memory comprises:
         determining a count N of the one or more CWs;
         retrieving N CW indexes from the CW pool on a first-in-first-out basis;
         removing the N CW indexes from the CW pool; and
         associating the N CW indexes with the host data,
      wherein the storing of the one or more CWs comprises:
         receiving a request from a channel controller, the request comprising the read tag and indicating readiness to transfer the one or more CWs; and
         storing the one or more CWs transferred from the channel controller into N CW spaces of the buffer memory that are associated with the retrieved N CW indexes and the read tag.

10. The storage device of claim 9, wherein the instructions stored on the memory, when executed by the processor, further cause the processor to perform de-allocating the allocated space in the buffer memory.

11. The storage device of claim 10, wherein the de-allocating of the allocated space in the buffer memory comprises adding the removed N CW indexes to the CW pool.

12. The storage device of claim 9, wherein the plurality of CW indexes is added to the CW pool at time of initialization of the storage device.

13. The storage device of claim 9, wherein the extracting of the host data from the one or more retrieved CWs comprises:
   decoding the one or more CWs to generate one or more payload sections and corresponding one or more parity sections; and
   combining the one or more payload sections to recreate the host data.

14. The storage device of claim 13, wherein the decoding of the one or more payload sections comprises:
   instructing an error correction code (ECC) engine to decode the one or more CWs and to generate the one or more corrected payload sections and the corresponding one or more parity sections;
   receiving the one or more corrected payload sections,
   wherein bits of the one or more corrected payload sections are corrected by the ECC engine based on the one or more corresponding parity sections.

15. A storage device configured to transfer host data to a host in response to a host read command, the storage device comprising:
   a host controller coupled to the host and configured to receive the host read command, to receive host data from a self-organized fast release buffer (FRB), and to transfer the host data to the host;
   a channel controller coupled to a non-volatile memory of the storage device and configured to retrieve one or more codewords (CWs) from the non-volatile memory and to transfer the one or more CWs to the FRB;
   a central processing unit (CPU) coupled the host controller and the FRB, and configured to send to the FRB a command to read host data from the non-volatile memory in response to the host read command received by the host controller;
   an error correction code (ECC) engine coupled to the FRB and configured to decode the one or more CWs; and
   the self-organized fast release buffer (FRB) comprising:
      a processor; and
      a memory having stored thereon instructions that, when executed by the processor, cause the processor to perform:
         receiving the command to read the host data stored in the non-volatile memory from the CPU, the host data being stored in the non-volatile memory as one or more CWs, the command comprising a read tag;
         allocating space in a buffer memory of the FRB for storage of the one or more CWs;
         receiving the one or more CWs from the channel controller;
         storing the one or more CWs into the allocated space in the buffer memory;
         extracting the host data from the stored one or more CWs; and
         sending the host data to the host controller for transfer to the host,
         wherein the buffer memory comprises a plurality of codeword (CW) spaces, each CW space of the plurality of CW spaces being associated with a CW index of a plurality of CW indexes, the CW indexes being stored in a CW pool of the FRB, and
         wherein the allocating of the space in the buffer memory comprises:
            determining a count N of the one or more CWs;
            retrieving N CW indexes from the CW pool on a first-in-first-out basis;
            removing the N CW indexes from the CW pool; and
            associating the N CW indexes with the host data,
         wherein the storing of the one or more CWs comprises:
            receiving a request from a channel controller, the request comprising the read tag and indicating readiness to transfer the one or more CWs; and storing the one or more CWs transferred from the channel controller into N CW spaces of the buffer memory that are associated with the retrieved N CW indexes and the read tag.

16. The storage device of claim 15, wherein the extracting of the host data from the one or more retrieved CWs comprises:
- instructing the ECC engine to decode the one or more CWs and to generate one or more corrected payload sections and corresponding one or more parity sections;
- receiving the one or more corrected payload sections; and
- combining the one or more corrected payload sections to recreate the host data.

* * * * *